US012345886B2

(12) United States Patent
Kim et al.

(10) Patent No.: US 12,345,886 B2
(45) Date of Patent: Jul. 1, 2025

(54) WEARABLE DEVICE OUTPUTTING SOUND FOR OBJECT OF INTEREST AND METHOD FOR CONTROLLING THE SAME

(71) Applicant: SAMSUNG ELECTRONICS CO., LTD., Suwon-si (KR)

(72) Inventors: Jonghwan Kim, Suwon-si (KR); Changtaek Kang, Suwon-si (KR); Jaeha Park, Suwon-si (KR); Seongkwan Yang, Suwon-si (KR); Yonghoon Lee, Suwon-si (KR); Jeock Lee, Suwon-si (KR); Chulmin Choi, Suwon-si (KR); Hochul Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/540,551

(22) Filed: Dec. 14, 2023

(65) Prior Publication Data

US 2024/0192492 A1    Jun. 13, 2024

Related U.S. Application Data

(63) Continuation of application No. PCT/KR2023/020444, filed on Dec. 12, 2023.

(30) Foreign Application Priority Data

Dec. 13, 2022 (KR) .................. 10-2022-0173318
Dec. 16, 2022 (KR) .................. 10-2022-0177362

(51) Int. Cl.
*G02B 27/01* (2006.01)
*G06F 3/16* (2006.01)
*G06V 10/764* (2022.01)

(52) U.S. Cl.
CPC .......... *G02B 27/017* (2013.01); *G06F 3/165* (2013.01); *G06V 10/764* (2022.01); *G02B 2027/0178* (2013.01)

(58) Field of Classification Search
CPC .......... G02B 27/017; G02B 2027/0178; G06F 3/011–013; G06F 3/165; G06V 10/764
See application file for complete search history.

(56) References Cited

U.S. PATENT DOCUMENTS

| 11,290,837 B1* | 3/2022 | Brimijoin, II | .......... H04S 7/304 |
| 2012/0206452 A1* | 8/2012 | Geisner | ................ G06F 3/013 345/419 |

(Continued)

FOREIGN PATENT DOCUMENTS

| JP | 2000-325389 A | 11/2000 |
| KR | 10-2014-0072651 A | 6/2014 |

(Continued)

OTHER PUBLICATIONS

International Search Report issued Apr. 3, 2024 by the International Searching Authority in International Patent Application No. PCT/KR2023/020444.

(Continued)

*Primary Examiner* — Hang Lin
(74) *Attorney, Agent, or Firm* — Sughrue Mion, PLLC

(57) ABSTRACT

A wearable device outputting a sound for an object of interest and a method for controlling the same are disclosed. In an embodiment, a wearable device may comprise at least one microphone, at least one speaker, and at least one processor. The at least one processor may be configured to identify an object of interest of a user wearing the wearable device, obtain a sound signal generated from the identified object of interest using the at least one microphone, and output the sound signal generated from the object of interest through the at least one speaker or output a sound related to (Continued)

the object of interest through the at least one speaker, based on a sensitivity of the obtained sound signal.

18 Claims, 22 Drawing Sheets

(56) References Cited

U.S. PATENT DOCUMENTS

| | | |
|---|---|---|
| 2014/0152696 A1 | 6/2014 | Jung et al. |
| 2016/0080874 A1 | 3/2016 | Fullam |
| 2016/0259977 A1 | 9/2016 | Asbun et al. |
| 2017/0199543 A1 | 7/2017 | Rhee et al. |
| 2020/0059748 A1 | 2/2020 | Fox et al. |
| 2020/0260210 A1 | 8/2020 | Kim et al. |
| 2021/0055367 A1* | 2/2021 | Poore .................. G01S 3/8083 |
| 2022/0021998 A1 | 1/2022 | Bae |
| 2022/0329726 A1 | 10/2022 | Cho et al. |
| 2022/0377486 A1 | 11/2022 | Arya |
| 2023/0145966 A1 | 5/2023 | Jeong et al. |

FOREIGN PATENT DOCUMENTS

| | | |
|---|---|---|
| KR | 10-2014-0091194 A | 7/2014 |
| KR | 10-2016-0001465 A | 1/2016 |
| KR | 10-2016-0066896 A | 6/2016 |
| KR | 10-2017-0042164 A | 4/2017 |
| KR | 10-2018-0066276 A | 6/2018 |
| KR | 10-2018-0118034 A | 10/2018 |
| KR | 10-2021-0117654 A | 9/2021 |
| KR | 10-2022-0043088 A | 4/2022 |
| KR | 10-2022-0140221 A | 10/2022 |

OTHER PUBLICATIONS

Written Opinion issued Apr. 3, 2024 by the International Searching Authority in International Patent Application No. PCT/KR2023/020444.

* cited by examiner

WEARABLE DEVICE OUTPUTTING SOUND FOR OBJECT OF INTEREST AND METHOD FOR CONTROLLING THE SAME

CROSS-REFERENCE TO RELATED APPLICATIONS

This application is a by-pass continuation of International Application No. PCT/KR2023/020444, filed on Dec. 12, 2023, which is based on and claims priority to Korean Patent Application No. 10-2022-0173318, filed on Dec. 13, 2022, in the Korean Intellectual Property Office, and to Korean Patent Application No. 10-2022-0177362, filed on Dec. 16, 2022, in the Korean Intellectual Property Office, the disclosure of each of which is incorporated by reference herein in its entirety.

BACKGROUND

1. Field

The disclosure relates to a wearable device outputting a sound for an object of interest and a method for controlling the same.

2. Description of Related Art

More and more services and additional functions are being provided via a device, such as augmented reality (AR) glasses. To meet the needs of various users and raise use efficiency of wearable devices, communication service carriers or wearable device manufacturers are competing to develop wearable devices with differentiated and diversified functionalities. Accordingly, various functions that are provided through wearable devices are evolving more and more.

SUMMARY

A wearable device (e.g., a glasses-type wearable device configured to provide augmented reality) may provide a virtual object related to a real world object. The conventional wearable device may merely provide the user wearing the wearable device with the sound (e.g., sound included in video) related to designated content (e.g., video provided through the video application), but may not provide the function or operation of outputting additional sound signals. For example, the conventional wearable device may not provide the function or operation of recognizing a real world object (e.g., the real world object of interest to the user) included in the real world and outputting an additional sound signal and/or image signal related to the recognized real world object.

The disclosure provides a wearable device that may provide an augmented reality and/or virtual reality environment that may further immerse the user in the real world by outputting a sound signal and/or image signal related to a real world object (e.g., the object of interest to the user wearing the wearable device) included in the real world through the wearable device.

The disclosure also provides a method for controlling a wearable device that may provide an augmented reality and/or virtual reality environment that may further immerse the user in the real world by outputting a sound signal and/or image signal related to a real world object (e.g., the object of interest to the user wearing the wearable device) included in the real world through the wearable device.

The disclosure also provides a wearable device that may provide an augmented reality and/or virtual reality environment that may further immerse the user in the real world by outputting a sound signal and/or image signal related to a real world object (e.g., the object of interest to the user wearing the wearable device) included in the real world through the wearable device.

According to an aspect of the disclosure, a wearable device includes: at least one microphone: at least one speaker: memory storing instructions: and at least one processor. The instructions, when executed by the at least one processor cause the wearable device to identify an object of interest. The instructions cause the wearable device to obtain, using the at least one microphone, a sound signal generated from the object of interest. The instructions cause the wearable device to output through the at least one speaker, based on a sensitivity of the sound signal generated from the object of interest, the sound signal generated from the object of interest or a sound related to the object of interest.

The wearable device may further include: at least one camera, wherein the instructions, when executed by the at least one processor, further cause the wearable device to identify the object of interest based on the sound signal generated from the object of interest or an image obtained by the at least one camera.

The instructions, when executed by the at least one processor, further cause the wearable device to control the at least one speaker to output an amplified version of the sound signal generated from the object of interest.

The instructions, when executed by the at least one processor, further cause the wearable device to: based on identifying the sensitivity of the sound signal generated from the object of interest as being less than a designated level, output, through the at least one speaker, a sound stored in the at least one memory corresponding to the object of interest.

The wearable device may further include: at least one display module, wherein the instructions, when executed by the at least one processor, further cause the wearable device to control the at least one display module to display image information related to the object of interest as a virtual object.

The instructions, when executed by the at least one processor, further cause the wearable device to output, through the at least one speaker, the sound signal generated from the object of interest and an effect sound related to the sound signal generated from the object of interest.

The instructions, when executed by the at least one processor, further cause the wearable device to: based on identifying whether the sensitivity of the sound signal generated from the object of interest decreases, provide a notification related to the object of interest through the at least one speaker or the at least one display module.

The instructions, when executed by the at least one processor, further cause the wearable device to, based on identifying that the object of interest is positioned outside a viewing angle range of a user wearing the wearable device, provide a virtual object representing the object of interest and a sound signal related to the object of interest.

The wearable device may further include: at least one sensor, wherein the instructions, when executed by the at least one processor, further cause the wearable device to provide information related to the object of interest based on position information about the wearable device detected by the at least one sensor and a shape of the object of interest.

The instructions, when executed by the at least one processor, further cause the wearable device to: estimate a viewing angle of a user wearing the wearable device, and provide, based on the estimated viewing angle, an image corresponding to at least one real world object positioned outside the estimated viewing angle or a sound related to the at least one real world object.

According to an aspect of the disclosure, a method for controlling a wearable device may comprise identifying an object of interest. The method may comprise obtaining a sound signal generated from the object of interest using at least one microphone of the wearable device. The method may comprise, based on a sensitivity of the sound signal generated by the object of interest, outputting through at least one speaker of the wearable device the sound signal generated from the object of interest or a sound related to the object of interest.

The method may further comprise: identifying the object of interest based on the sound signal generated from the object of interest or an image obtained by at least one camera of the wearable device.

The method may further comprise: based on identifying the sensitivity of the sound signal generated from the object of interest as being equal to or greater than a designated level, outputting, through the at least one speaker, an amplified version of the sound signal generated from the object of interest.

The method may further comprise: based on identifying the sensitivity of the sound signal generated from the object of interest as being less than the designated level, outputting, through the at least one speaker, a sound corresponding to the object of interest stored in at least one memory of the wearable device.

The method may further comprise: controlling at least one display module of the wearable device to display image information related to the object of interest as a virtual object.

The method may further comprise: outputting, through the at least one speaker, the sound signal generated from the object of interest and an effect sound related to the sound signal generated from the object of interest.

The method may further comprise: based on identifying whether the sensitivity of the sound signal generated from the object of interest decreases, providing a notification related to the object of interest through the at least one speaker or the at least one display module.

The method may further comprise: based on identifying that the object of interest is positioned outside a viewing angle range of a user wearing the wearable device, providing a virtual object representing the object of interest and a sound signal related to the object of interest.

The method may further comprise: providing information related to the object of interest based on position information about the wearable device detected by at least one sensor of the wearable device and a shape of the object of interest.

The method may further comprise: estimating a viewing angle of a user wearing the wearable device; and providing, based on the estimated viewing angle, an image corresponding to at least one real world object positioned outside an estimated viewing angle of a user wearing the wearable device or a sound related to the at least one real world object.

According to an aspect of the disclosure, a wearable device includes: at least one microphone: at least one speaker: at least one camera: at least one display module; at least one memory storing at least one instruction; and at least one processor in communication with the at least one microphone, the at least one speaker, the at least one camera, the at least one display module, and the at least one memory. The at least one processor is configured to execute the at least one instruction to: identify an object of interest. The at least one processor is configured to obtain, using the at least one microphone, a sound signal generated from the object of interest. The at least one processor is configured to, based on a sensitivity of the sound signal generated from the object of interest, output through the at least one speaker the sound signal generated from the object of interest or a sound related to the object of interest, identify the object of interest based on the sound signal generated from the object of interest or an image obtained by the at least one camera, and control the at least one display module to display image information related to the object of interest as a virtual object.

According to an aspect of the disclosure, a non-transitory computer readable medium including instructions stored therein, which when executed by at least one processor cause the at least one processor to execute a method of controlling a wearable device. The method may comprise identifying an object of interest. The method may comprise obtaining a sound signal generated from the object of interest using at least one microphone of the wearable device. The method may comprise, based on a sensitivity of the sound signal generated by the object of interest, outputting through at least one speaker of the wearable device the sound signal generated from the object of interest or a sound related to the object of interest.

The effects set forth herein are not limited thereto, and it is apparent to one of ordinary skill in the art that various effects may be disclosed herein.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
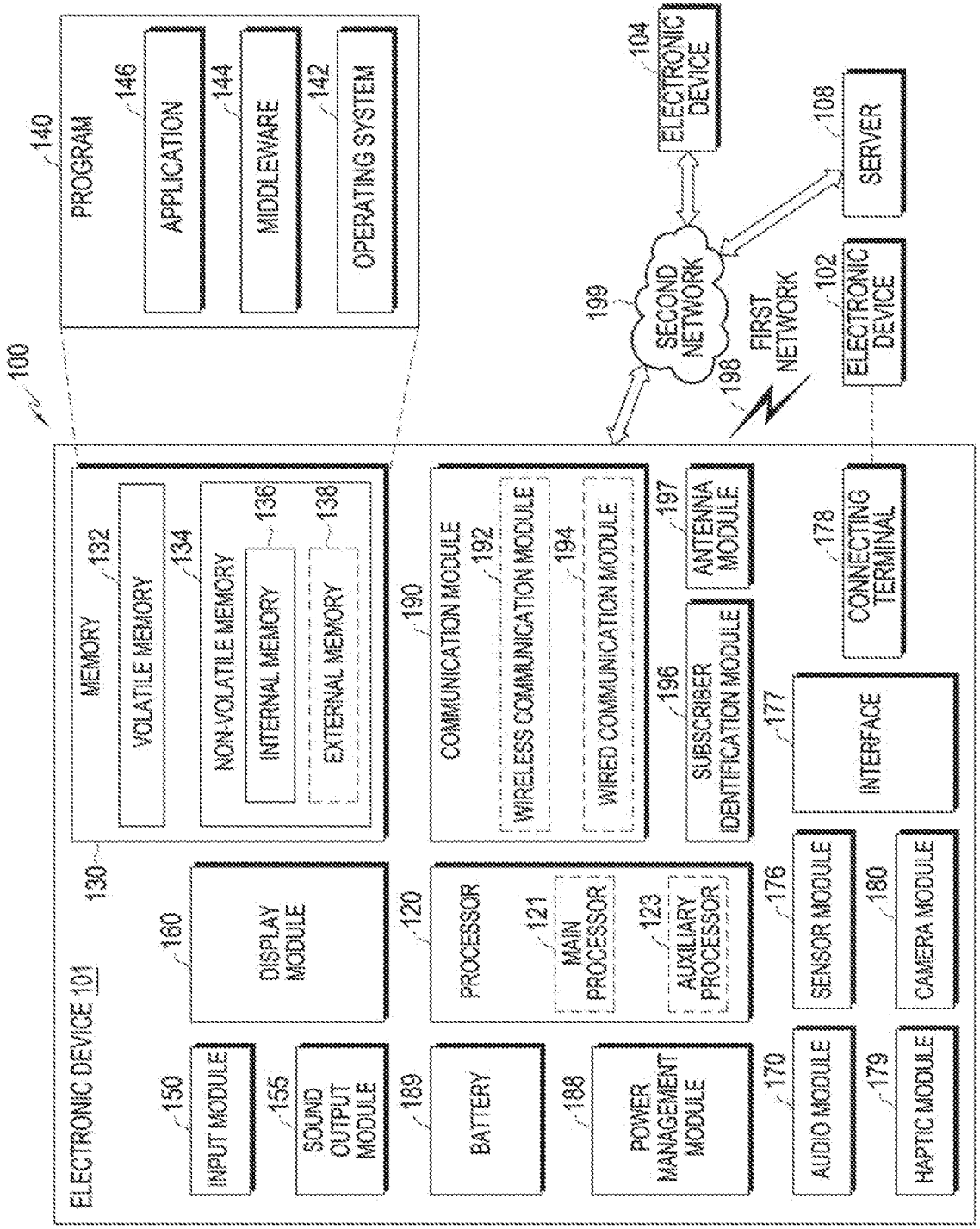
FIG. 1 is a block diagram illustrating an electronic device in a network environment according to one or more embodiments of the disclosure.

FIG. 1 is a block diagram illustrating an electronic device 101 in a network environment 100 according to one or more embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to one or more embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IOT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
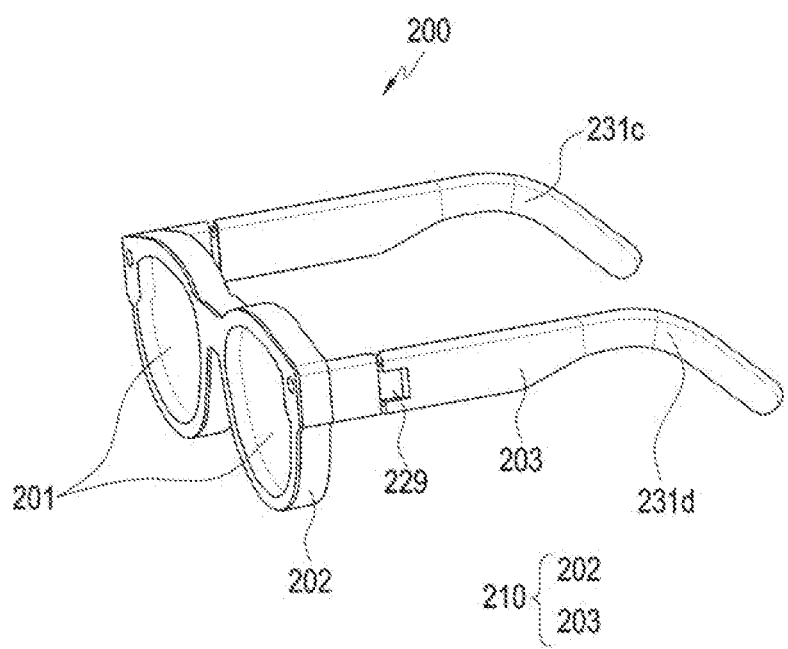
FIG. 2A is a perspective view illustrating a wearable device (e.g., an electronic device) according to an embodiment of the disclosure.

FIG. 2A is a perspective view illustrating a wearable device 200 according to an embodiment.

Referring to FIG. 2A, the wearable device 200 may be a glasses-type electronic device, and the user may visually recognize her surrounding objects or environment while wearing the wearable device 200. For example, the wearable device 200 may be a head-mounted device (HMD) or smart glasses capable of providing images directly in front of the user's eyes. The configuration of the wearable device 200 of FIG. 2A may be identical in whole or part to the configuration of the electronic device 101 of FIG. 1.

According to one or more embodiments, the wearable device 200 may include a housing that forms the exterior of the wearable device 200. The housing 210 may provide a space in which components of the wearable device 200 may be disposed. For example, the housing 210 may include a lens frame 202 and at least one wearing member 203.

According to one or more embodiments, the wearable device 200 may include a display member 201 capable of providing the user with visual information. For example, the display member 201 may include a module equipped with a lens, a display, a waveguide, and/or a touch circuit. According to an embodiment, the display member 201 may be transparent or semi-transparent. According to an embodiment, the display member 201 may include a semi-transparent glass or a window member the light transmittance of which may be adjusted as the coloring concentration is adjusted. According to an embodiment, a pair of display members 201 may be provided and disposed to correspond to the user's left and right eyes, respectively, with the wearable device 200 worn on the user's body.

According to one or more embodiments, the lens frame 202 may receive at least a portion of the display member 201. For example, the lens frame 202 may surround at least a portion of the display member 201. According to an embodiment, the lens frame 202 may position at least one of the display members 201 to correspond to the user's eye. According to an embodiment, the lens frame 202 may be the rim of a normal eyeglass structure. According to an embodiment, the lens frame 202 may include at least one closed loop surrounding the display devices 201.

According to one or more embodiments, the wearing members 203 may extend from the lens frame 202. For example, the wearing members 203 may extend from ends of the lens frame 202 and, together with the lens frame 202, may be supported and/or positioned on a part (e.g., ears) of the user's body. According to an embodiment, the wearing members 203 may be rotatably coupled to the lens frame 202 through hinge structures 229. According to an embodiment, the wearing member 203 may include an inner side surface 231c configured to face the user's body and an outer side surface 231d opposite to the inner side surface.

According to one or more embodiments, the wearable device 200 may include the hinge structures 229 configured to fold the wearing members 203 on the lens frame 202. The hinge structure 229 may be disposed between the lens frame 202 and the wearing member 203. While the wearable device 200 is not worn, the user may fold the wearing members 203 on the lens frame 202 to carry or store the electronic device.

Figure 2B:
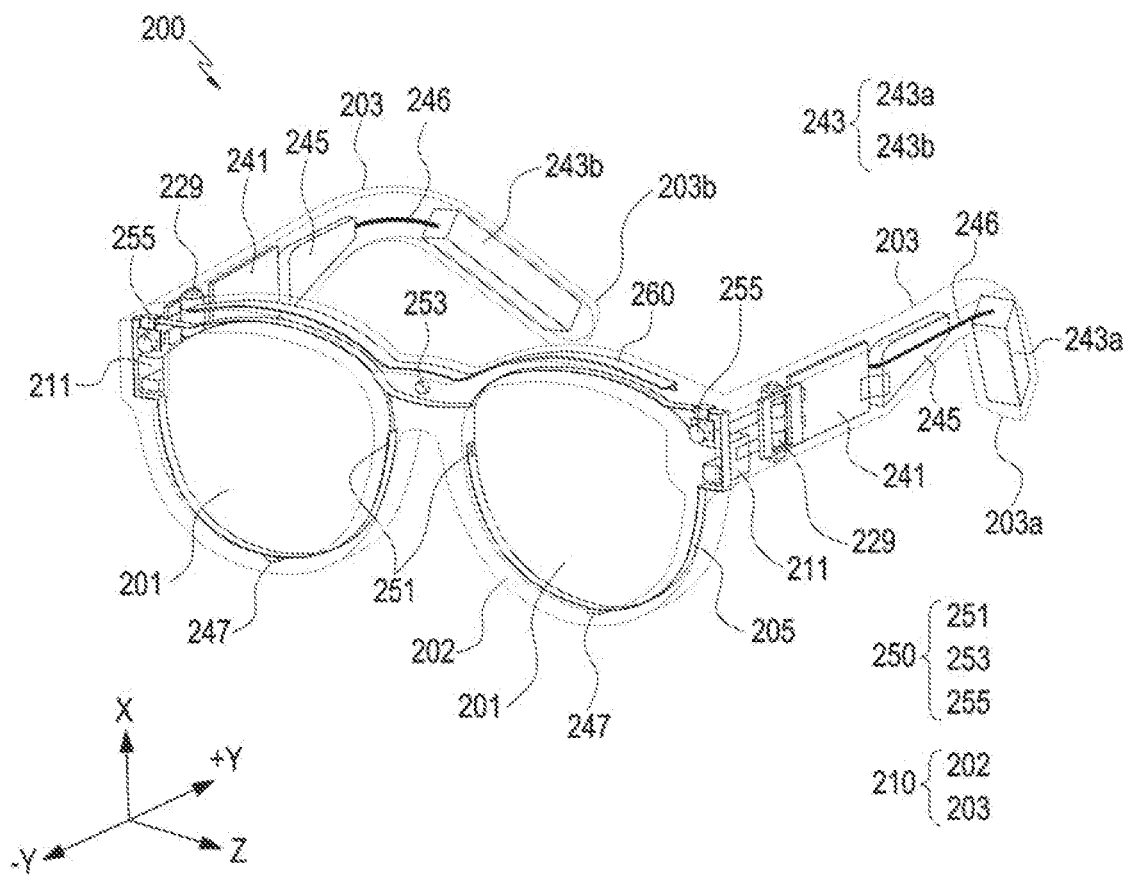
FIG. 2B is a perspective view illustrating an internal configuration of a wearable device (e.g., an electronic device) according to an embodiment of the disclosure.
Figure 2C:
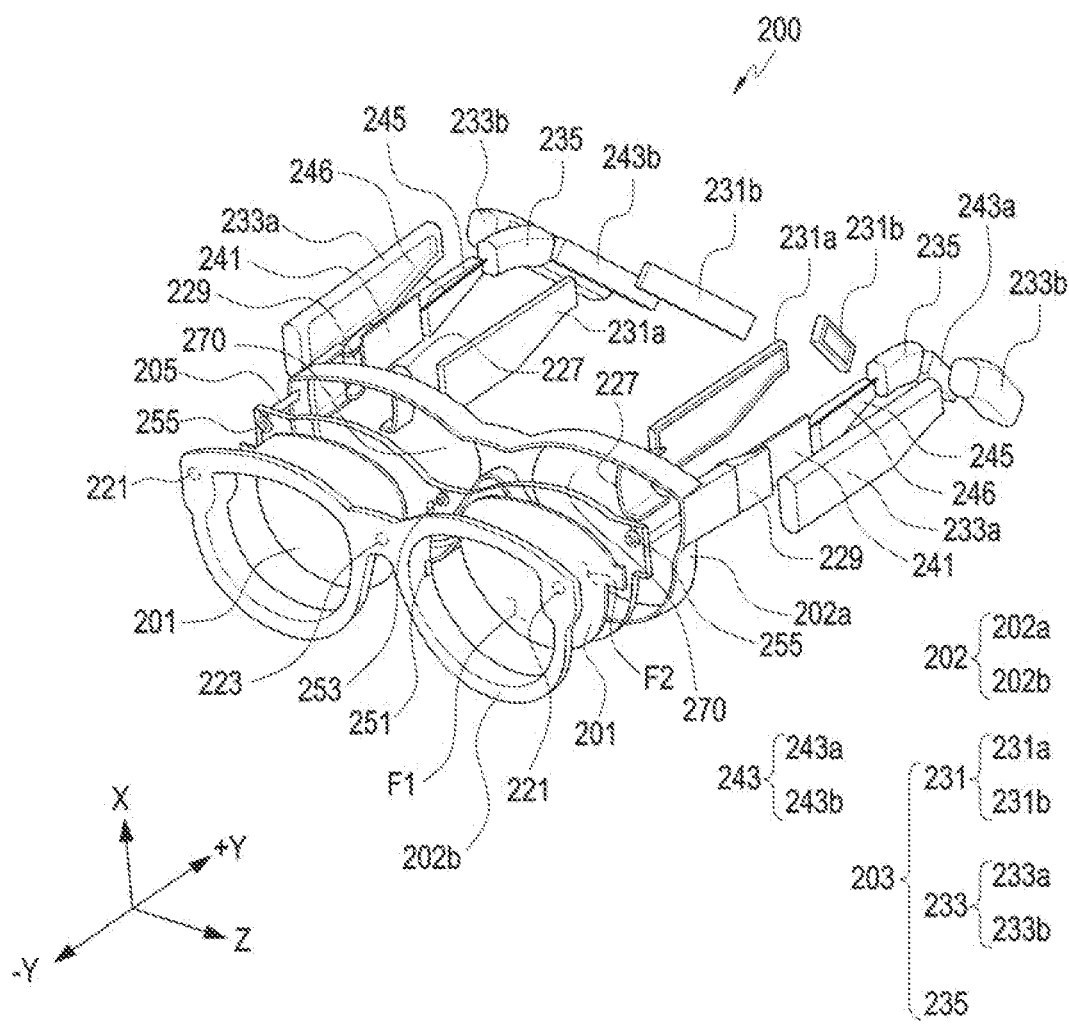
FIG. 2C is an exploded perspective view illustrating a wearable device (e.g., an electronic device) according to an embodiment of the disclosure.

FIG. 2B is a perspective view illustrating an internal configuration of a wearable device according to an embodiment of the disclosure. FIG. 2C is an exploded perspective view illustrating a wearable device according to an embodiment of the disclosure.

Referring to FIGS. 2B and 2C, a wearable device 200 may include components received in the housing 210 (e.g., at least one circuit board 241 (e.g., printed circuit board (PCB), printed board assembly (PBA), flexible PCB, or rigid-flexible PCB (RFPCB)), at least one battery 243, at least one speaker module 245, at least one power transfer structure 246, and a camera module 250). The configuration of the housing 210 of FIG. 2B may be identical in whole or part to the configuration of the display member 201, the lens frame 202, the wearing members 203, and the hinge structures 229 of FIG. 2A.

According to one or more embodiments, the wearable device 200 may obtain and/or recognize a visual image regarding an object or environment in the direction (e.g., −Y direction) in which the wearable device 200 faces or the direction in which the user gazes, using the camera module 250 (e.g., the camera module 180 of FIG. 1) and may receive information regarding the object or environment from an external electronic device (e.g., the electronic device 102 or 104 or the server 108 of FIG. 1) through a network (e.g., the first network 198 or second network 199 of FIG. 1). In an embodiment, the wearable device 200 may provide the received object- or environment-related information, in the form of an audio or visual form, to the user. The wearable device 200 may provide the received object- or environment-related information, in a visual form, to the user through the display members 201, using the display module (e.g., the display module 160 of FIG. 1). For example, the wearable device 200 may implement augmented reality (AR) by implementing the object- or environment-related information in a visual form and combining it with an actual image of the user's surrounding environment.

According to one or more embodiments, the display member 201 may include a first surface F1 facing in a direction (e.g., −y direction) in which external light is incident and a second surface F2 facing in a direction (e.g., +y direction) opposite to the first surface F1. With the user wearing the wearable device 200, at least a portion of the light or image coming through the first surface F1 may be incident on the user's left eye and/or right eye through the second surface F2 of the display member 201 disposed to face the user's left eye and/or right eye.

According to one or more embodiments, the lens frame 202 may include at least two or more frames. For example, the lens frame 202 may include a first frame 202a and a second frame 202b. According to an embodiment, when the user wears the wearable device 200, the first frame 202a may be a frame of the portion facing the user's face, and the second frame 202b may be a portion of the lens frame 202 spaced from the first frame 202a in the gazing direction (e.g., −Y direction) in which the user gazes.

According to one or more embodiments, the light output module 211 may provide an image and/or video to the user. For example, the light output module 211 may include a display panel capable of outputting images and a lens corresponding to the user's eye and guiding images to the display member 201. For example, the user may obtain the image output from the display panel of the light output module 211 through the lens of the light output module 211. According to one or more embodiments, the light output module 211 may include a device configured to display various information. For example, the light output module 211 may include at least one of a liquid crystal display (LCD), a digital mirror device (DMD), a liquid crystal on silicon (LCoS), or an organic light emitting diode (OLED), or a micro light emitting diode (micro LED). According to an embodiment, when the light output module 211 and/or the display member 201 includes one of an LCD, a DMD, or an LCoS, the wearable device 200 may include a light output module 211 and/or a light source emitting light to the display area of the display member 201. According to an embodiment, when the light output module 211 and/or the display member 201 may include OLEDs or micro LEDs, the wearable device 200 may provide virtual images to the user without a separate light source.

According to one or more embodiments, at least a portion of the light output module 211 may be disposed in the housing 210. For example, the light output module 211 may be disposed in the wearing member 203 or the lens frame 202 to correspond to each of the user's right eye and left eye. According to an embodiment, the light output module 211 may be connected to the display member 201 and may provide images to the user through the display member 201.

According to one or more embodiments, the circuit board 241 may include components for driving the wearable device 200. For example, the circuit board 241 may include at least one integrated circuit chip. Further, at least one of the processor 120, the memory 130, the power management module 188, or the communication module 190 of FIG. 1 may be provided in the integrated circuit chip. According to an embodiment, a circuit board 241 may be disposed in the wearing member 203 of the housing 210. According to an embodiment, the circuit board 241 may be electrically connected to the battery 243 through the power transfer structure 246. According to an embodiment, the circuit board 241 may be connected to the flexible printed circuit board 205 and may transfer electrical signals to the electronic components (e.g., the light output module 211, the camera module 250, and the light emitting unit) of the electronic device through the flexible printed circuit board 205. According to an embodiment, the circuit board 241 may be a circuit board including an interposer.

According to one or more embodiments, the flexible printed circuit board 205 may extend from the circuit board 241 through the hinge structure 229 to the inside of the lens frame 202 and may be disposed in at least a portion of the inside of the lens frame 202 around the display member 201.

According to one or more embodiments, the battery 243 (e.g., the battery 189 of FIG. 1) may be connected with components (e.g., the light output module 211, the circuit board 241, and the speaker module 245, the microphone module 247, and the camera module 250) of the wearable device 200 and may supply power to the components of the wearable device 200.

According to one or more embodiments, at least a portion of the battery 243 may be disposed in the wearing member 203. According to an embodiment, batteries 243 may be disposed in ends 203a and 203b of the wearing members 203. For example, the batteries 243 may include a first battery 243a disposed in a first end 203a of the wearing member 203 and a second battery 243b disposed in a second end 203b of the wearing member 203.

According to one or more embodiments, the speaker module 245 (e.g., the audio module 170 or the sound output module 155 of FIG. 1) may convert an electrical signal into sound. At least a portion of the speaker module 245 may be disposed in the wearing member 203 of the housing 210. According to an embodiment, the speaker module 245 may be located in the wearing member 203 to correspond to the user's ear. For example, the speaker module 245 may be disposed between the circuit board 241 and the battery 243.

According to one or more embodiments, the power transfer structure 246 may transfer the power from the battery 243 to an electronic component (e.g., the light output module 211) of the wearable device 200. For example, the power transfer structure 246 may be electrically connected to the battery 243 and/or the circuit board 241, and the circuit board 241 may transfer the power received through the power transfer structure 246 to the light output module 211. According to an embodiment, the power transfer structure 246 may be connected to the circuit board 241 through the speaker module 245. For example, when the wearable device 200 is viewed from a side (e.g., in the Z-axis direction), the power transfer structure 246 may at least partially overlap the speaker module 245.

According to one or more embodiments, the power transfer structure 246 may be a component capable of transferring power. For example, the power transfer structure 246 may include a flexible printed circuit board or wiring. For example, the wiring may include a plurality of cables. In one or more embodiments, various changes may be made to the shape of the power transfer structure 246 considering the number and/or type of the cables.

According to one or more embodiments, the microphone module 247 (e.g., the input module 150 and/or the audio module 170 of FIG. 1) may convert a sound into an electrical signal. According to an embodiment, the microphone module 247 may be disposed in at least a portion of the lens frame 202. For example, at least one microphone module 247 may be disposed on a lower end (e.g., in the −X-axis direction) and/or on an upper end (e.g., in the X-axis direction) of the wearable device 200. According to one or more embodiments, the wearable device 200 may more clearly recognize the user's voice using voice information (e.g., sound) obtained by the at least one microphone module 247. For example, the wearable device 200 may distinguish the voice information from the ambient noise based on the obtained voice information and/or additional information (e.g., low-frequency vibration of the user's skin and bones). For example, the wearable device 200 may clearly recognize the user's voice and may perform a function of reducing ambient noise (e.g., noise canceling). In an embodiment, the microphone module 247 may include a plurality of microphone modules 247 to perform beamforming. In an embodiment, the microphone module 247 may include a non-directional or directional microphone.

According to one or more embodiments, the camera module 250 may capture a still image and/or a video. The camera module 250 may include at least one of a lens, at least one image sensor, an image signal processor, or a flash. According to an embodiment, the camera module 250 may be disposed in the lens frame 202 and may be disposed around the display member 201.

According to one or more embodiments, the camera module 250 may include at least one first camera module 251. According to an embodiment, the first camera module 251 may capture the trajectory of the user's eye (e.g., a pupil) or gaze. For example, the first camera module 251 may capture the reflection pattern of the light emitted by the light emitting unit to the user's eyes. For example, the light emitting unit may emit light in an infrared band for tracking the trajectory of the gaze using the first camera module 251. For example, the light emitting unit may include an IR LED. According to an embodiment, the processor (e.g., the processor 120 of FIG. 1) may adjust the position of the virtual image so that the virtual image projected on the display member 201 corresponds to the direction in which the user's pupil gazes. According to an embodiment, the first camera module 251 may include a global shutter (GS)-type camera. It is possible to track the trajectory of the user's eyes or gaze using a plurality of third camera modules 251 having the same specifications and performance.

According to one or more embodiments, the first camera module 251 may periodically or aperiodically transmit information related to the trajectory of the user's eye or gaze (e.g., trajectory information) to the processor (e.g., the processor 120 of FIG. 1). According to an embodiment, when the first camera module 251 detects a change in the user's gaze based on the trajectory information (e.g., when the user's eyes move more than a reference value with the head positioned still), the first camera module 251 may transmit the trajectory information to the processor.

According to one or more embodiments, the camera modules 250 may include at least one second camera module 253. According to an embodiment, the second camera module 253 may capture an external image. According to an embodiment, the second camera module 253 may be a global shutter-type or rolling shutter (RS)-type camera. According to an embodiment, the second camera module 253 may capture an external image through the second optical hole 223 formed in the second frame 202b. For example, the second camera module 253 may include a high-resolution color camera, and it may be a high resolution (HR) or photo video (PV) camera. Further, the second camera module 253 may provide an auto-focus (AF) function and an optical image stabilizer (OIS) function.

According to one or more embodiments, the wearable device 200 may include a flash positioned adjacent to the second camera module 253. For example, the flash may provide light for increasing brightness (e.g., illuminance) around the wearable device 200 when an external image is obtained by the second camera module 253, thereby reducing difficulty in obtaining an image due to the dark environment, the mixing of various light beams, and/or the reflection of light.

According to one or more embodiments, the camera modules 250 may include at least one third camera module 255. According to an embodiment, the third camera module 255 may capture the user's motion through a first optical hole 221 formed in the lens frame 202. For example, the third camera module 255 may capture the user's gesture (e.g., hand gesture). Third camera modules 255 and/or first optical holes 221 may be disposed on two opposite sides of the lens frame 202 (e.g., the second frame 202b), e.g., formed in two opposite ends of the lens frame 202 (e.g., the second frame 202b) with respect to the X direction. According to an embodiment, the third camera module 255 may be a global shutter (GS)-type camera. For example, the third camera module 255 may be a camera supporting 3DoF (degrees of freedom) or 6DoF, which may provide position recognition and/or motion recognition in a 360-degree space (e.g., omni-directionally). According to an embodiment, the third camera modules 255 may be stereo cameras and may perform the functions of simultaneous localization and mapping (SLAM) and user motion recognition using a plurality of global shutter-type cameras with the same specifications and performance. According to an embodiment, the third camera module 255 may include an infrared (IR) camera (e.g., a time of flight (TOF) camera or a structured light camera). For example, the IR camera may be operated as at least a portion of a sensor module (e.g., the sensor module 176 of FIG. 1) for detecting a distance from the subject.

According to an embodiment, at least one of the first camera module 251 or the third camera module 255 may be replaced with a sensor module (e.g., the sensor module 176 of FIG. 1) (e.g., lidar sensor). For example, the sensor module may include at least one of a vertical cavity surface emitting laser (VCSEL), an infrared sensor, and/or a photodiode. For example, the photodiode may include a positive intrinsic negative (PIN) photodiode or an avalanche photodiode (APD). The photodiode may be referred to as a photo detector or a photo sensor.

According to an embodiment, at least one of the first camera module 251, the second camera module 253, and the third camera module 255 may include a plurality of camera modules. For example, the second camera module 253 may include a plurality of lenses (e.g., wide-angle and telephoto lenses) and image sensors and may be disposed on one surface (e.g., a surface facing in the −Y axis) of the wearable device 200. For example, the wearable device 200 may include a plurality of camera modules having different properties (e.g., angle of view) or functions and control to change the angle of view of the camera module based on the user's selection and/or trajectory information. At least one of the plurality of camera modules may be a wide-angle camera and at least another of the plurality of camera modules may form a telephoto camera.

According to one or more embodiments, the processor (e.g., processor 120 of FIG. 1) may determine the motion of the wearable device 200 and/or the user's motion using information for the wearable device 200 obtained using at least one of a gesture sensor, a gyro sensor, or an acceleration sensor of the sensor module (e.g., the sensor module 176 of FIG. 1) and the user's action (e.g., approach of the user's body to the wearable device 200) obtained using the second camera module 253. According to an embodiment, in addition to the above-described sensor, the wearable device 200 may include a magnetic (geomagnetic) sensor capable of measuring an orientation using a magnetic field and magnetic force lines and/or a hall sensor capable of obtaining motion information (e.g., moving direction or distance) using the strength of a magnetic field. For example, the processor may determine the motion of the wearable device 200 and/or the user's motion based on information obtained from the magnetic (geomagnetic) sensor and/or the hall sensor.

According to one or more embodiments, the wearable device 200 may perform an input function (e.g., a touch and/or pressure sensing function) capable of interacting with the user. For example, a component configured to perform a touch and/or pressure sensing function (e.g., a touch sensor and/or a pressure sensor) may be disposed in at least a portion of the wearing member 203. The wearable device 200 may control the virtual image output through the display member 201 based on the information obtained through the components. For example, a sensor associated with a touch and/or pressure sensing function may be configured in various types, e.g., a resistive type, a capacitive type, an electro-magnetic (EM) type, or an optical type. According to an embodiment, the component configured to perform the touch and/or pressure sensing function may be identical in whole or part to the configuration of the input module 150 of FIG. 1.

According to one or more embodiments, the wearable device 200 may including a reinforcing member 260 that is disposed in an inner space of the lens frame 202 and formed to have a higher rigidity than that of the lens frame 202.

According to one or more embodiments, the wearable device 200 may include a lens structure 270. The lens structure 270 may refract at least a portion of light. For example, the lens structure 270 may be a prescription lens having refractive power. According to an embodiment, the lens structure 270 may be disposed behind (e.g., +Y direction) the second window member of the display member 201. For example, the lens structure 270 may be positioned between the display member 201 and the user's eye. For example, the lens structure 270 may face the display member.

According to one or more embodiments, the housing 210 may include a hinge cover 227 that may conceal a portion of the hinge structure 229. Another part of the hinge structure 229 may be received or hidden between an inner case 231 and an outer case 233, which are described below.

According to one or more embodiments, the wearing member 203 may include the inner case 231 and the outer case 233. The inner case 231 may be, e.g., a case configured to face the user's body or directly contact the user's body, and may be formed of a material having low thermal conductivity, e.g., a synthetic resin. According to an embodiment, the inner case 231 may include an inner side surface (e.g., the inner side surface 231c of FIG. 2A) facing the user's body. The outer case 233 may include, e.g., a material (e.g., a metal) capable of at least partially transferring heat and may be coupled to the inner case 231 to face each other. According to an embodiment, the outer case 233 may include an outer side surface (e.g., the outer side surface 231d of FIG. 2A) opposite to the inner side surface 331c. In an embodiment, at least one of the circuit board 241 or the speaker module 245 may be received in a space separated from the battery 243 in the wearing member 203. In the illustrated embodiment, the inner case 231 may include a first case 231*a* including the circuit board 241 or the speaker module 245 and a second case 231*b* receiving the battery 243, and the outer case 233 may include a third case 233*a* coupled to face the first case 231*a* and a fourth case 233*b* coupled to face the second case 231*b*. For example, the first case 231*a* and the third case 233*a* may be coupled (hereinafter, 'first case portions 231*a* and 233*a*') to receive the circuit board 241 and/or the speaker module 245, and the second case 231*b* and the fourth case 233*b* may be coupled (hereinafter, 'second case portions 231*b* and 233*b*') to receive the battery 343.

According to one or more embodiments, the first case portions 231*a* and 233*a* may be rotatably coupled to the lens frame 202 through the hinge structure 229, and the second case portions 231*b* and 233*b* may be connected or mounted to the ends of the first case portions 231*a* and 233*a* through the connecting member 235. In one or more embodiments, a portion of the connecting member 235 in contact with the user's body may be formed of a material having low thermal conductivity, e.g., an elastic material, such as silicone, polyurethane, or rubber, and another portion thereof which does not come into contact with the user's body may be formed of a material having high thermal conductivity (e.g., a metal). For example, when heat is generated from the circuit board 241 or the battery 243, the connecting member 235 may block heat transfer to the portion in contact with the user's body while dissipating or discharging heat through the portion not in contact with the user's body. According to an embodiment, a portion of the connecting member 235 configured to come into contact with the user's body may be interpreted as a portion of the inner case 231, and a portion of the connecting member 235 that does not come into contact with the user's body may be interpreted as a portion of the outer case 233. According to an embodiment, the first case 231*a* and the second case 231*b* may be integrally configured without the connecting member 235, and the third case 233*a* and the fourth case 233*b* may be integrally configured without the connecting member 235. According to one or more embodiments, other components (e.g., the antenna module 197 of FIG. 1) may be further included in addition to the illustrated components, and information regarding an object or environment may be received from an external electronic device (e.g., the electronic device 102 or 104 or server 108 of FIG. 1) through a network (e.g., the first network 198 or second network 199 of FIG. 1) using the communication module 190.

Although only the wearable device 200 is illustrated and described in FIGS. 2A to 2C, the present disclosure is not limited thereto, and some components of the wearable device 200 illustrated in FIGS. 2A to 2C may be included in electronic devices, such as smartphones and tablet PCs.

In an embodiment, the wearable device 200 may identify whether the user is wearing the wearable device 200 through a proximity sensor included in the wearable device 200. Alternatively, in an embodiment, the wearable device 200 may determine whether the wearable device 200 is worn on the user according to whether the frame of the wearable device 200 is unfolded (e.g., the unfolded state) and whether the approach of the user is detected while the frame of the wearable device 200 is unfolded, through the angle sensor provided on the hinge portion of the wearable device 200.

Figure 3:
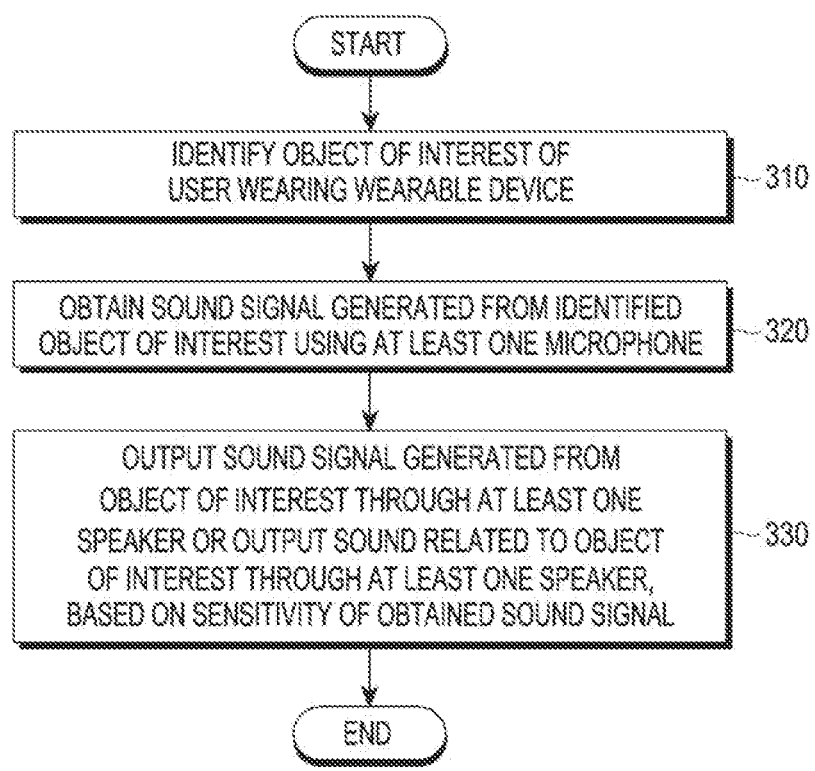
FIG. 3 is a view illustrating an example function or operation of outputting an object-of-interest sound (e.g., a sound generated from the object of interest and obtained by the wearable device and/or a sound related to the object of interest) by a wearable device according to an embodiment.

FIG. 3 is a view illustrating an example function or operation of outputting an object-of-interest sound (e.g., a sound (e.g., the first sound 520) generated from the object of interest 410 and obtained by the wearable device 200 and/or a sound (e.g., the second sound 530 and/or the third sound 540) related to the object of interest) by a wearable device 200 according to an embodiment. In various embodiments described below, "a sensitivity" of a sound signal is used to encompass "volume", "strength", or "level" of the sound signal. And, in various embodiments described below, the "sensitivity" can be replaced by the terms "volume", "strength", or "level".

Figure 4A:
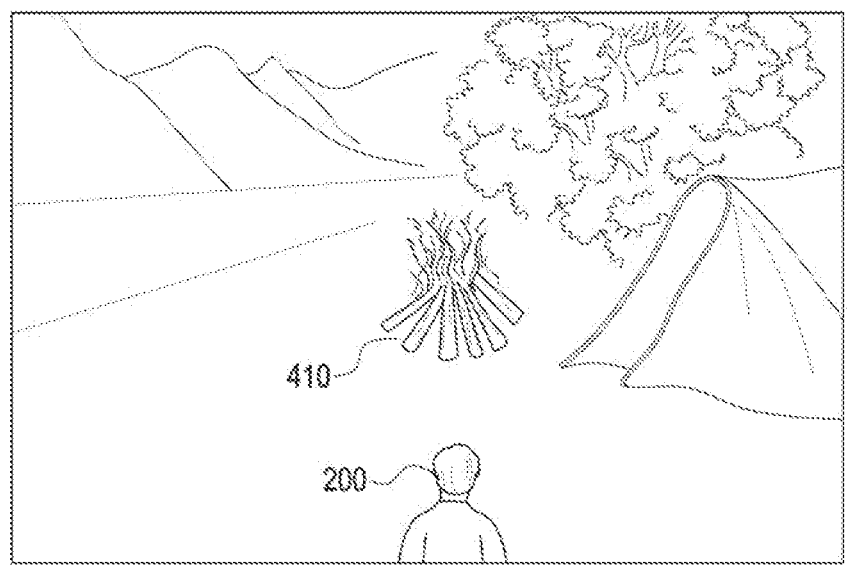
FIGS. 4A and 4B are views illustrating examples for describing an object of interest according to an embodiment.
Figure 4B:
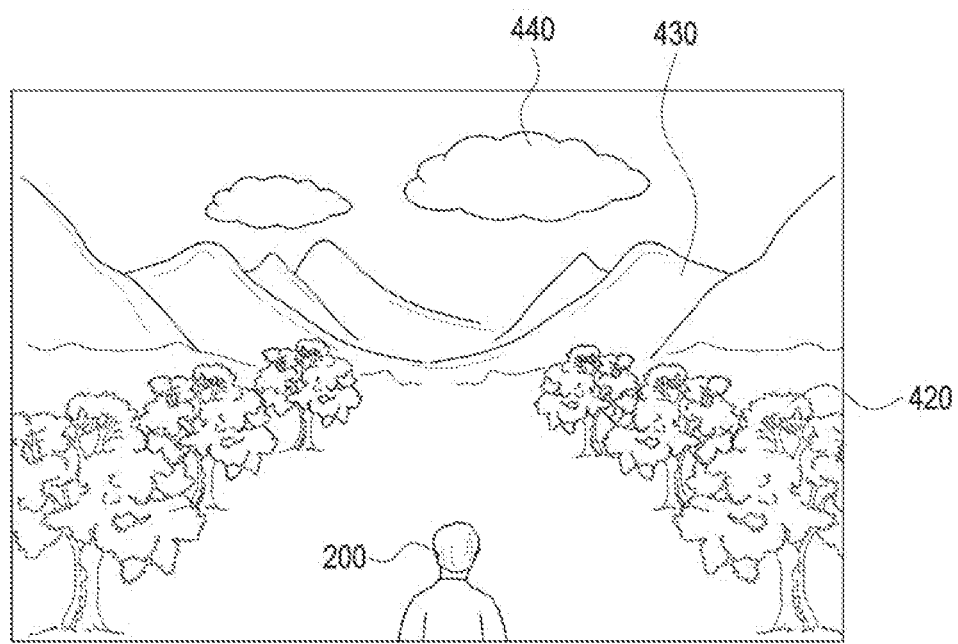

Referring to FIG. 3, in an embodiment, in operation 310, the wearable device 200 may identify an object of interest (e.g., a first real world object 410) of the user wearing the wearable device 200. FIGS. 4A and 4B are views illustrating an example object of interest (e.g., the first real world object 410 and/or a landscape) in an embodiment. In an embodiment, the object of interest (e.g., the first real world object 410) may include at least one real world object (e.g., the first real world object 410) included in the real world. Alternatively, in an embodiment, the object of interest 410 may include a specific scene (e.g., a landscape including the second real world object 420, the third real world object 430, and/or the fourth real world object 440, as illustrated in FIG. 4B) obtained by at least one camera (e.g., the second camera module 253). For example, the wearable device 200 may identify which object the real world object (e.g., the first real world object 410) is by comparing the image of the real world object (e.g., the first real world object 410) obtained by the wearable device 200 (e.g., the second camera module 253) with an image stored in the wearable device 200 or an external device (e.g., a server). For example, the wearable device 200 may identify which object the real world object (e.g., the first real world object 410) is by comparing the sound signal of the real world object (e.g., the first real world object 410) obtained by the wearable device 200 (e.g., at least one speaker module 245) with a sound signal stored in the wearable device 200 or an external device (e.g., a server). For example, the wearable device 200 may identify a specific place or position when the wearable device 200 is in the specific place or position, identify the direction in which the wearable device 200 faces from the identified specific place or position, and identify the type of at least one real world object (e.g., the first real world object 410) positioned in the direction in which the wearable device 200 faces. To that end, e.g., the wearable device 200 or an external device (e.g., a server) may store position information about at least one real world object (e.g., the first real world object 410) disposed at the specific place or position. For example, the wearable device 200 may identify which object is the real world object (e.g., the first real world object 410) positioned in a specific direction by using the position information about the real world object (e.g., the first real world object 410) and the direction in which the wearable device 200 faces from the current position. Further, various techniques for identifying a real world object (e.g., the first real world object 410) positioned in the real world by the wearable device 200 may be applied to one or more embodiments of the disclosure.

According to an embodiment, the wearable device 200 may identify the direction of the gaze of the user wearing the wearable device 200 through at least one camera (e.g., the first camera module 251). In an embodiment, the wearable device 200 may identify at least one real world object (e.g., the first real world object 410) corresponding to the gaze of the user among the at least one real world object included in the real world. According to an embodiment, the wearable device 200 may determine at least one real world object (e.g., the first real world object 410) corresponding to the gaze of the user as the object of interest. For example, the wearable device 200 may identify the gesture of the user wearing the wearable device 200 through at least one camera (e.g., the third camera module 255). For example, the user's gesture may include the user's gesture indicating one specific real world object (e.g., the first real world object 410) among at least one real world object. In an embodiment, the wearable device 200 may identify at least one real world object (e.g., the first real world object 410) corresponding to the gesture of the user among the at least one real world object included in the real world. According to an embodiment, the wearable device 200 may determine at least one real world object (e.g., the first real world object 410) corresponding to the gesture of the user as the object of interest. According to an embodiment, the wearable device 200 may automatically (e.g., regardless of the user's gaze and/or gesture) determine the object of interest (e.g., the first real world object 410) based on the learned data. For example, in an embodiment, when the wearable device 200 is positioned in a specific place at a specific time and/or when a specific sound signal is obtained, the wearable device 200 may automatically (e.g., regardless of the user's gaze and/or gesture) determine the object of interest (e.g., the first real world object 410) based on the learned data. The learned data according to an embodiment may include history information about the object of interest (e.g., the first real world object 410) determined at a specific time, history information about the object of interest (e.g., the first real world object 410) determined at a specific place, history information about the object of interest (e.g., the first real world object 410) determined based on a specific sound, and/or history information about the object of interest determined by an external electronic device operably connected to the wearable device 200. According to an embodiment, when a sound signal having a specific sensitivity (e.g., in decibels (dB)) or less is obtained and the gaze of the user wearing the wearable device 200 does not face a specific real world object (e.g., the second real world object 420, the third real world object 430, and/or the fourth real world object 440), the wearable device 200 may determine a specific scene (e.g., a landscape including the second real world object 420, the third real world object 430, and/or the fourth real world object 440 as illustrated in FIG. 4B) obtained by at least one camera (e.g., the second camera module 253) itself as the object of interest. For example, the wearable device 200 may identify that the user wearing the wearable device 200 is looking at the landscape. According to an embodiment, the wearable device 200 may determine one specific scene (e.g., the landscape including the second real world object 420, third real world object 430, and/or fourth real world object 440 as illustrated in 4B) obtained by at least one camera (e.g., the second camera module 253), as the object of interest, even when a sound signal having a specific sensitivity (e.g., decibels (dB)) or less is obtained, and the plurality of real world objects (e.g., the second real world object 420, the third real world object 430, and/or the fourth real world object 440) are alternately gazed at designated time intervals. In an embodiment, the wearable device 200 may determine the real world object (e.g., the first real world object 410) corresponding to the user's gaze as the object of interest while the user's gaze on the object of interest (e.g., the first real world object 410) is maintained. According to an embodiment, when the user's gaze on the object of interest (e.g., the first real world object 410) is maintained for the designated time or more (e.g., when the gaze direction is changed after the gaze on the real world object is maintained for 5 seconds or more), the wearable device 200 may determine the real world object (e.g., the first real world object 410) corresponding to the user's gaze as the object of interest. According to an embodiment, when a designated time elapses after the object of interest is determined, the wearable device 200 may release the setting of the object of interest for the real world object (e.g., the first real world object 410 and/or the landscape). In an embodiment, the wearable device 200 may maintain the setting of the object of interest for the real world object (e.g., the first real world object 410 and/or the landscape) even after a designated time elapses after the object of interest is determined.

Figure 5A:
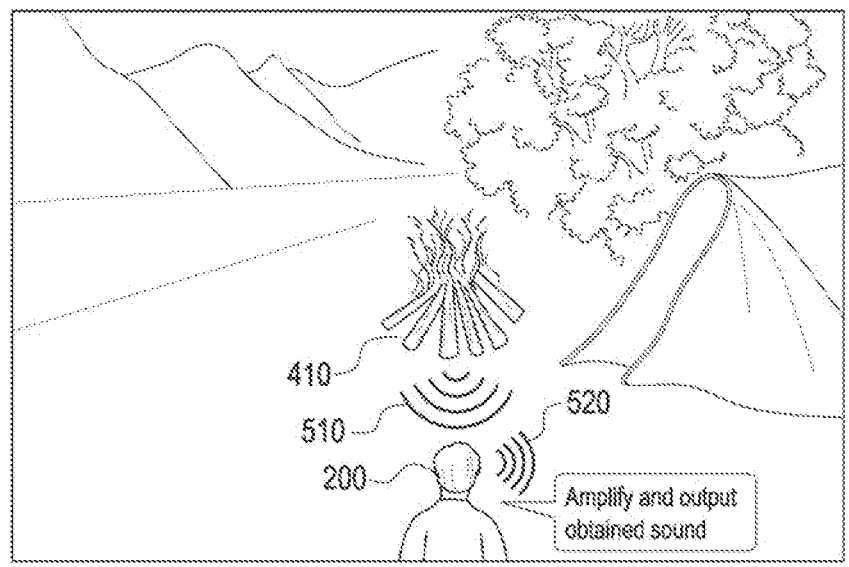
FIG. 5A is a view illustrating an example function or operation of emphasizing and outputting an object-of-interest sound (e.g., a sound generated from the object of interest and obtained by the wearable device) by a wearable device according to an embodiment.
Figure 5B:
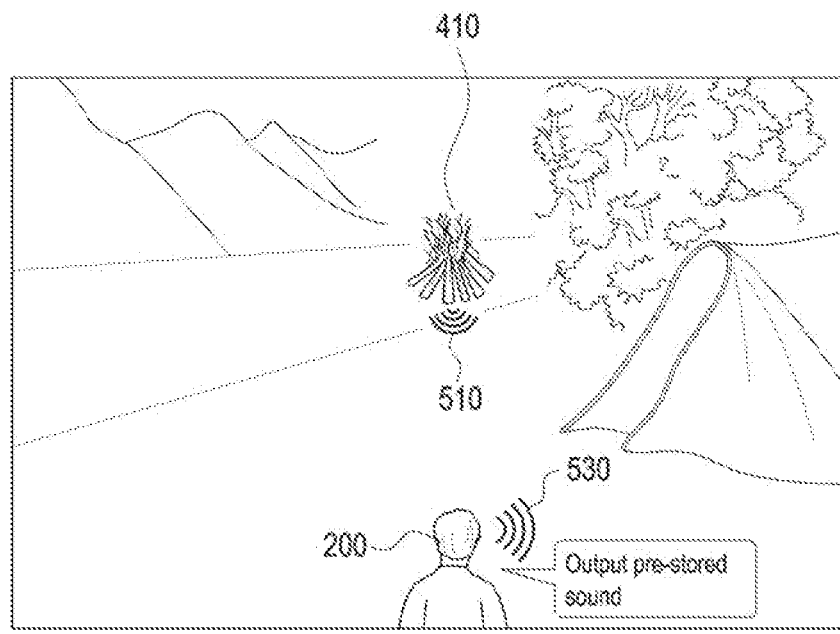
FIGS. 5B and 5C are views illustrating an example function or operation of outputting an object-of-interest sound (e.g., a sound pre-stored in the wearable device, related to the object of interest) by a wearable device according to an embodiment.
Figure 5C:
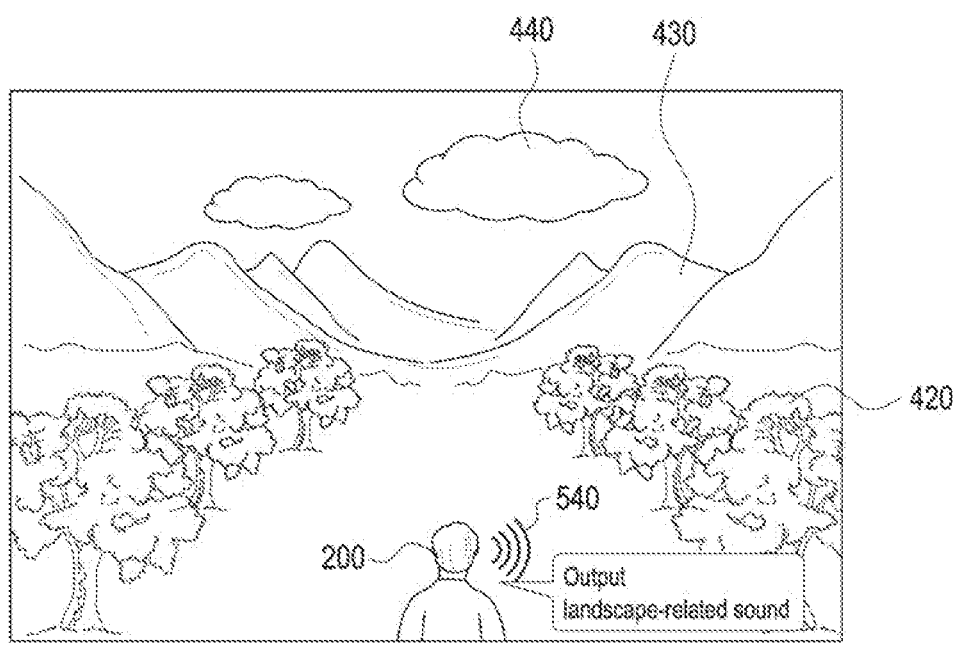

According to an embodiment of the disclosure, in operation 320, the wearable device 200 may obtain a sound signal generated from the identified object of interest (e.g., the first real world object 410) using at least one microphone (e.g., the microphone module 247). FIG. 5A is a view illustrating an example function or operation of emphasizing and outputting an object-of-interest sound (e.g., a sound generated from the object of interest (e.g., the first real world object 410) and obtained by the wearable device 200) by a wearable device 200 according to an embodiment. FIGS. 5B and 5C are views illustrating an example function or operation of outputting an object-of-interest sound (e.g., a sound pre-stored in the wearable device 200, related to the object of interest) by a wearable device 200 according to an embodiment. In an embodiment, the wearable device 200 may perform audio beamforming on at least one object of interest (e.g., the first real world object 410) using at least one microphone (e.g., the microphone module 247). In an embodiment, when there are a plurality of objects of interest, the wearable device 200 may perform audio beamforming on each of the plurality of objects of interest (e.g., the first real world object 410) by using at least one microphone (e.g., the microphone module 247). In an embodiment, when the object of interest is identified as any one scene (e.g., landscape), the wearable device 200 may obtain a sound signal (e.g., wind sound) generated from an external environment by using at least one microphone (e.g., the microphone module 247) without performing audio beamforming on a specific real world object (e.g., non-directionally). Alternatively, in an embodiment, when the object of interest is identified as any one scene (e.g., a landscape), the wearable device 200 may be configured not to obtain a sound signal (e.g., a wind sound) generated from an external environment by deactivating (e.g., switching from an ON state to an OFF state) at least one microphone (e.g., the microphone module 247).

In an embodiment, in operation 330, the wearable device 200 may output the sound signal (e.g., the first sound signal 510) generated from the object of interest (e.g., the first real world object 410 and/or landscape) through at least one speaker (e.g., at least one speaker module 245) or output a sound (e.g., the third sound signal 530 and/or the fourth sound signal 540) related to the object of interest (e.g., the first real world object 410 and/or landscape) through at least one speaker (e.g., at least one speaker module 245), based on the sensitivity (e.g., decibels) of the sound signal obtained according to operation 320. As used herein, the phrases "sound generated from the object of interest", "sound in which the sound generated from the object of interest is emphasized", and "sound related to the object of interest" may be collectively referred to as an "object-of-interest sound" for convenience of description. As used herein, the term "sound related to the object of interest" may refer to a sound representing the object of interest (e.g., the first real world object 410 and/or a landscape) stored in the wearable device 200 and/or an external electronic device (e.g., a server) and/or a sound capable of reminding the user wearing the wearable device 200 of the object of interest (e.g., the first real world object 410 and/or a landscape). In an embodiment, the wearable device 200 may identify the sensitivity (e.g., decibels) of the sound signal obtained according to operation 320 to output the object-of-interest sound through the wearable device 200. In an embodiment, the sensitivity of the sound signal may be, e.g., substantially 0 decibels, may exceed a designated sensitivity level, or may be less than or equal to the designated sensitivity level. According to an embodiment, as illustrated in FIG. 5A, when the sensitivity of the sound signal generated from the object of interest (e.g., the first real world object 410) and obtained by the wearable device 200 exceeds the designated sensitivity level, the wearable device 200 may output the sound signal generated from the object of interest (e.g., the first real world object 410) and obtained by the wearable device 200 or may emphasize (i.e., amplify) and output the sound signal (e.g., output a sound (e.g., the second sound signal 520) obtained by emphasizing the sound generated from the object of interest (e.g., the first real world object 410). For example, the wearable device 200 may increase and output the sensitivity of the sound signal obtained by the wearable device 200, thereby emphasizing and outputting the obtained sound signal. In an embodiment, when the sensitivity of the sound signal obtained from the object of interest (e.g., landscape) is less than or equal to the designated sensitivity level, the wearable device 200 may output, or emphasize and output the sound signal (e.g., wind sound) generated from the object of interest (e.g., landscape) and obtained by the wearable device 200. For example, the wearable device 200 may increase the volume of (i.e., amplify) the sound signal (e.g., wind sound) obtained by the wearable device 200 and output the sound signal, thereby emphasizing and outputting the obtained sound signal. In an embodiment, the wearable device 200 may output a sound (e.g., a sound of water flowing from a valley, a bird chirping sound, etc.) related to the object of interest (e.g., a landscape) stored in the wearable device 200 and/or an external electronic device (e.g., a server) together with the sound signal obtained by the wearable device 200, thereby emphasizing and outputting the obtained sound signal.

In an embodiment, as illustrated in FIGS. 5B and 5C, when the sensitivity of a sound signal (e.g., the first sound signal 510) generated from the object of interest (e.g., the first real world object 410) and obtained by the wearable device 200 is less than or equal to the designated sensitivity level, the wearable device 200 may output the sound related to the object of interest (e.g., the first real world object 410). For example, the wearable device 200 may output a sound related to the object of interest (e.g., the first real world object 410) (e.g., the third sound signal 530 as a sound of firewood crackling in a bonfire) stored in the wearable device 200 and/or an external electronic device (e.g., a server). In an embodiment, when the sensitivity of the sound signal generated from the object of interest (e.g., the first real world object 410) and obtained by the wearable device 200 is less than or equal to the designated sensitivity level, the wearable device 200 may output a sound related to the object of interest (e.g., a landscape) (e.g., the fourth sound signal 540 as a sound of water flowing from a valley, a bird chirping sound, or the like) stored in the wearable device 200 and/or an external electronic device (e.g., a server). In an embodiment, the wearable device 200 may output the object-of-interest sound while the setting of the object of interest (e.g., the first real world object 410 and/or the landscape) is maintained (e.g., while the user's gaze is directed toward the real world object (e.g., the first real world object 410)). Alternatively, in an embodiment, even while the setting of the object of interest (e.g., the first real world object 410 and/or the landscape) is maintained, the wearable device 200 may stop outputting the object-of-interest sound if a designated time elapses after outputting the object-of-interest sound or a user input is obtained. According to one or more embodiments of the disclosure, there may be provided a wearable device 200 that provides a user experience in which the user may immerse himself/herself in the surrounding environment by outputting a sound in which a more immersive sound is output through the wearable device 200.

Figure 6:
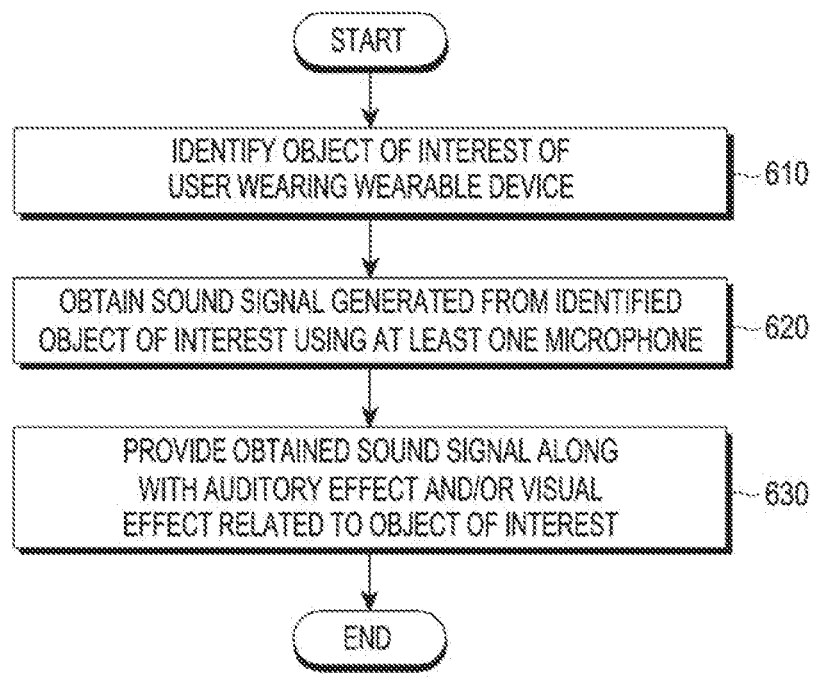
FIG. 6 is a view illustrating an example function or operation of providing an auditory effect and/or visual effect related to an object of interest along with an object-of-interest sound (e.g., a sound generated from the object of interest and obtained by the wearable device) by a wearable device according to an embodiment.
Figure 7A:
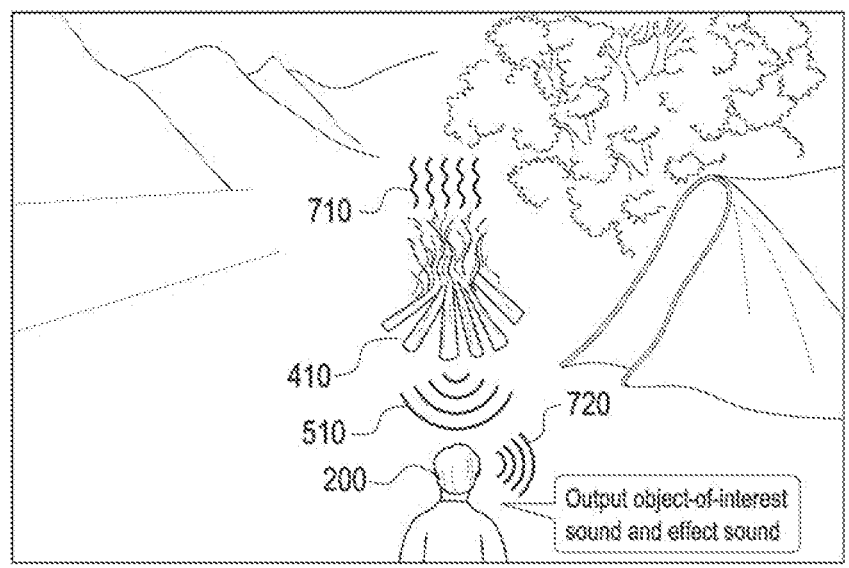
FIGS. 7A and 7B are views illustrating examples for describing a function or operation in terms of a user interface in the embodiment described in connection with FIG. 6.
Figure 7B:
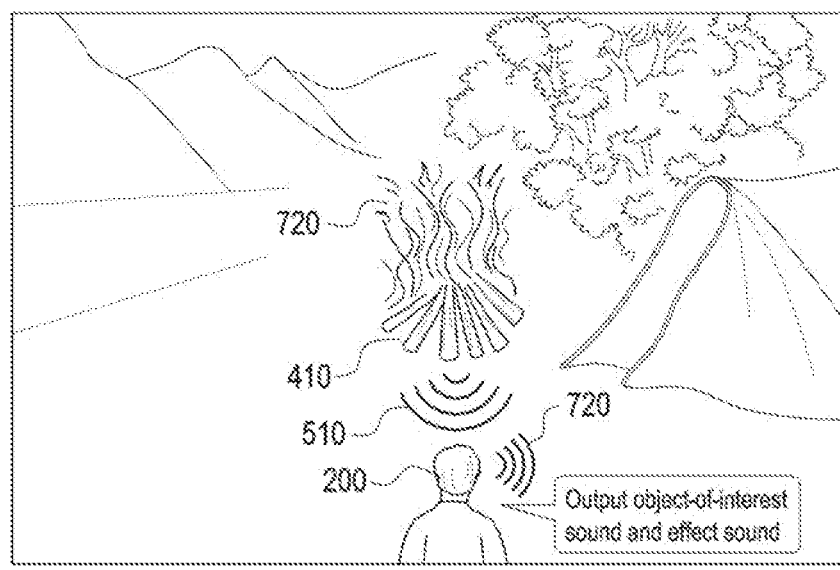

FIG. 6 is a view illustrating an example function or operation of providing an auditory effect (e.g., background music) and/or visual effect (e.g., the first visual effect 710 and/or second visual effect 720) related to an object of interest (e.g., the first real world object 410) along with an object-of-interest sound (e.g., a sound generated from the object of interest (e.g., the first real world object 410) and obtained by the wearable device 200) by a wearable device 200 according to an embodiment. FIGS. 7A and 7B are views illustrating examples for describing a function or operation in terms of a user interface in the embodiment described in connection with FIG. 6.

Referring to FIG. 6, in an embodiment, in operation 610, the wearable device 200 may identify an object of interest (e.g., a first real world object 410) of the user wearing the wearable device 200. In an embodiment, the object of interest (e.g., the first real world object 410) may include at least one real world object (e.g., the first real world object 410) included in the real world. Alternatively, in an embodiment, the object of interest 410 may include a specific scene (e.g., a landscape including the second real world object 420, the third real world object 430, and/or the fourth real world object 440, as illustrated in FIG. 4B) obtained by at least one camera (e.g., the second camera module 253). In an embodiment, the wearable device 200 may identify the direction of the gaze of the user wearing the wearable device 200 through at least one camera (e.g., the first camera module 251). In an embodiment, the wearable device 200 may identify at least one real world object (e.g., the first real world object 410) corresponding to the gaze of the user among the at least one real world object included in the real world. In an embodiment, the wearable device 200 may determine at least one real world object (e.g., the first real world object 410) corresponding to the gaze of the user as the object of interest. In an embodiment, the wearable device 200 may identify the gesture of the user wearing the wearable device 200 through at least one camera (e.g., the third camera module 255). In an embodiment, the user's gesture may include the user's gesture indicating one specific real world object (e.g., the first real world object 410) among at least one real world object. In an embodiment, the wearable device 200 may identify at least one real world object (e.g., the first real world object 410) corresponding to the gesture of the user among the at least one real world object included in the real world. In an embodiment, the wearable device 200 may determine at least one real world object (e.g., the first real world object 410) corresponding to the gesture of the user as the object of interest. In an embodiment, the wearable device 200 may automatically (e.g., regardless of the user's gaze and/or gesture) determine the object of interest (e.g., the first real world object 410) based on the learned data. For example, when the wearable device 200 is positioned in a specific place at a specific time and/or when a specific sound signal is obtained, the wearable device 200 may automatically (e.g., regardless of the user's gaze and/or gesture) determine the object of interest (e.g., the first real world object 410) based on the learned data.

In an embodiment of the disclosure, in operation 620, the wearable device 200 may obtain a sound signal generated from the object of interest (e.g., the first real world object 410) identified in operation 610, using at least one microphone (e.g., the microphone module 247). In an embodiment, the wearable device 200 may perform audio beamforming on at least one object of interest (e.g., the first real world object 410) using at least one microphone (e.g., the microphone module 247). In an embodiment, when there are a plurality of objects of interest, the wearable device 200 may perform audio beamforming on each of the plurality of objects of interest (e.g., the first real world object 410) by using at least one microphone (e.g., the microphone module 247). For example, when the object of interest is identified as any one scene (e.g., landscape), the wearable device 200 may obtain a sound signal (e.g., wind sound) generated from an external environment by using at least one microphone (e.g., the microphone module 247) without performing audio beamforming on a specific real world object (e.g., non-directionally). In an embodiment, when the object of interest is identified as any one scene (e.g., a landscape), the wearable device 200 may be configured not to obtain a sound signal (e.g., a wind sound) generated from an external environment by deactivating (e.g., switching from an ON state to an OFF state) at least one microphone (e.g., the microphone module 247).

In an embodiment, in operation 630, the wearable device 200 may provide the sound signal obtained according to operation 620 together with an auditory effect and/or a visual effect related to the object of interest (e.g., the first real world object 410). In an embodiment, the auditory effect may include background music related to the object of interest (e.g., the first real world object 410 and/or a landscape). In an embodiment, an external electronic device (e.g., a server) operably connected to the wearable device 200 or the wearable device 200 may store a lookup table in which a relationship between a plurality of objects of interest and auditory effects (e.g., background music) respectively corresponding to the plurality of objects of interest is defined. Alternatively, in an embodiment, learning data related to the object of interest may be stored in the wearable device 200 or an external electronic device (e.g., a server) operably connected to the wearable device 200. In an embodiment, the wearable device 200 may provide an auditory effect (e.g., background music) related to the object of interest (e.g., the first real world object 410 and/or the landscape) based on the lookup table and/or the learning data. In an embodiment, the data for the auditory effect may be stored in the wearable device 200 or an external electronic device (e.g., a server) operably connected to the wearable device 200. Alternatively, in an embodiment, the wearable device 200 may access the external electronic device (e.g., a server) storing auditory information through a designated application to provide the auditory effect through the wearable device 200 in a streaming manner. In an embodiment, the auditory effect may include not only background music, but also various sound effects (e.g., a sound of rain, a firewood crackling sound, or a bug chirping sound). In an embodiment, the visual effect may include a video effect (e.g., a video effect of smoke rising in a bonfire or a video effect of raining) related to the object of interest (e.g., the first real world object 410 and/or landscape). In an embodiment, an external electronic device (e.g., a server) operably connected to the wearable device 200 or the wearable device 200 may store a lookup table in which a relationship between a plurality of objects of interest and visual effects (e.g., a video effect of smoke rising in a bonfire or a video effect of raining) respectively corresponding to the plurality of objects of interest is defined. In an embodiment, the visual effect may further include a visual effect based on the current time, a visual effect based on the place where the wearable device 200 is currently positioned, and/or a visual effect based on the current weather. For example, when the current time is a nighttime (e.g., 8 pm), the wearable device 200 may provide a visual effect such as a star, a moon, and/or an aurora. For example, when the current place is a beach, the wearable device 200 may provide a visual effect such as an island and/or a lighthouse. For example, when the current weather is rainy, the wearable device 200 may provide a visual effect such as lightning and an auditory effect such as thunder. The relationship between the visual/auditory effect and the current time, current place, and/or current weather may be stored in the lookup table. Alternatively, in an embodiment, learning data related to the object of interest may be stored in the wearable device 200 or an external electronic device (e.g., a server) operably connected to the wearable device 200. In an embodiment, the wearable device 200 may provide a visual effect (e.g., a video effect of smoke rising in a bonfire or a video effect of raining) related to the object of interest (e.g., the first real world object 410 and/or the landscape) based on the lookup table and/or the learning data. In an embodiment, the data for the visual effect may be stored in the wearable device 200 or an external electronic device (e.g., a server) operably connected to the wearable device 200. FIG. 7A illustrates an embodiment in which the wearable device 200 provides an object-of-interest sound (e.g., a sound generated from the object of interest (e.g., the first real world object 410) and obtained, exceeding the designated sensitivity level), an auditory effect (e.g., background music), and/or a visual effect (e.g., the first visual effect 710 as a video effect of smoke rising) in an embodiment. FIG. 7B exemplarily illustrates an embodiment in which the wearable device 200 provides an object-of-interest sound (e.g., a sound generated from the object of interest (e.g., the first real world object 410) and obtained, exceeding the designated sensitivity level), an auditory effect (e.g., background music), and/or a visual effect (e.g., the second visual effect 720 as a video effect in which the flames of the bonfire are shown as more blazing than they actually are). In an embodiment, the wearable device 200 may provide an auditory effect and/or a visual effect while the setting of the object of interest (e.g., the first real world object 410 and/or the landscape) is maintained (e.g., while the user's gaze is directed toward the real world object (e.g., the first real world object 410)). Alternatively, in an embodiment, even while the setting of the object of interest (e.g., the first real world object 410 and/or the landscape) is maintained, the wearable device 200 may stop providing the auditory effect and/or the visual effect if a designated time elapses after outputting the object-of-interest sound or when a user input is obtained.

Figure 8:
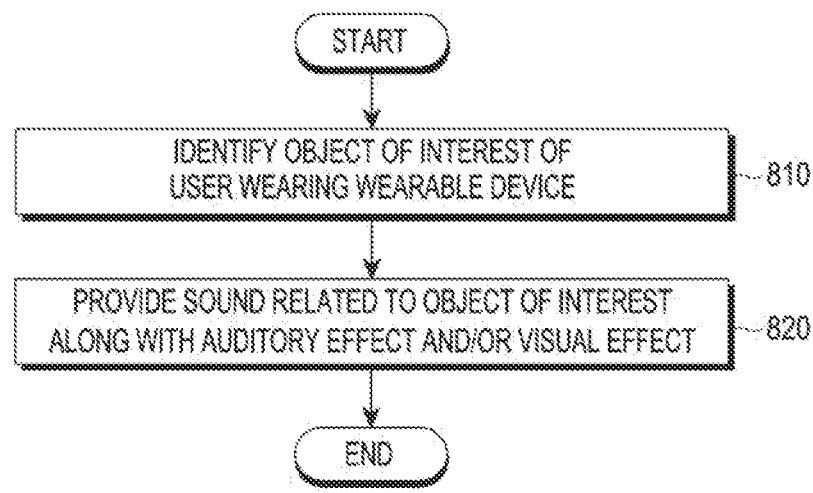
FIG. 8 is a view illustrating an example function or operation of providing an auditory effect and/or visual effect related to an object of interest along with an object-of-interest sound (e.g., a sound related to the object of interest) by a wearable device according to an embodiment.
Figure 9:
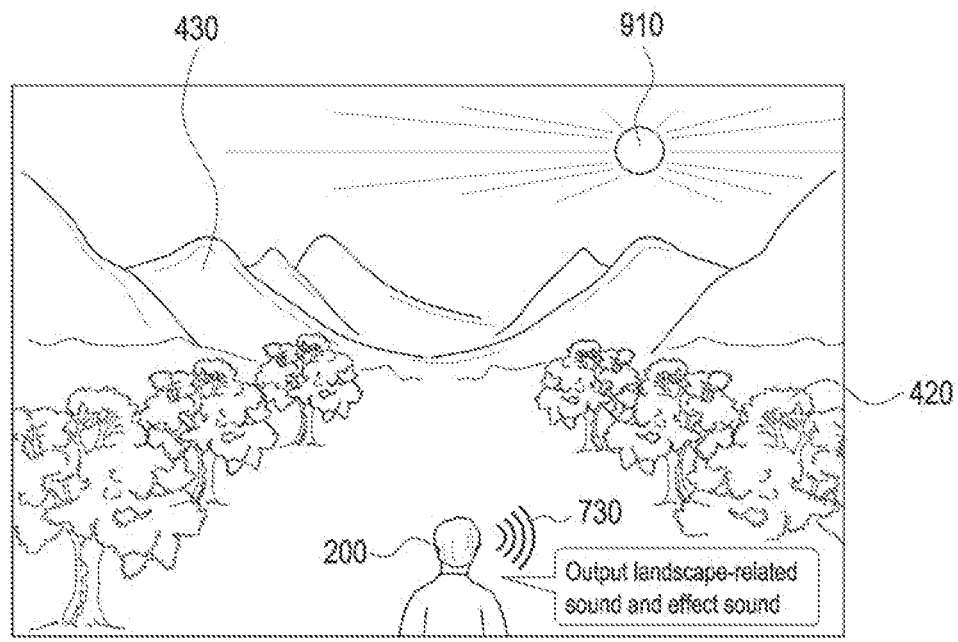
FIG. 9 is a view illustrating an example for describing a function or operation in terms of a user interface in the embodiment described in connection with FIG. 8.

FIG. 8 is a view illustrating an example function or operation of providing an auditory effect and/or visual effect related to an object of interest (e.g., a landscape) along with an object-of-interest sound (e.g., a sound related to the object of interest (e.g., a landscape) by a wearable device 200 according to an embodiment. FIG. 9 is a view illustrating an example for describing a function or operation in terms of a user interface in the embodiment described in connection with FIG. 8.

Referring to FIG. 8, in an embodiment, in operation 810, the wearable device 200 may identify an object of interest of the user wearing the wearable device 200. In an embodiment, the object of interest (e.g., the first real world object 410) may include at least one real world object (e.g., the first real world object 410) included in the real world. Alternatively, in an embodiment, the object of interest 410 may include a specific scene (e.g., a landscape including the second real world object 420, the third real world object 430, and/or the fourth real world object 440, as illustrated in FIG. 4B) obtained by at least one camera (e.g., the second camera module 253). In an embodiment, the wearable device 200 may identify the direction of the gaze of the user wearing the wearable device 200 through at least one camera (e.g., the first camera module 251). In an embodiment, the wearable device 200 may identify at least one real world object (e.g., the first real world object 410) corresponding to the gaze of the user among the at least one real world object included in the real world. In an embodiment, the wearable device 200 may determine at least one real world object (e.g., the first real world object 410) corresponding to the gaze of the user as the object of interest. In an embodiment, the wearable device 200 may identify the gesture of the user wearing the wearable device 200 through at least one camera (e.g., the third camera module 255). In an embodiment, the user's gesture may include the user's gesture indicating one specific real world object (e.g., the first real world object 410) among at least one real world object. In an embodiment, the wearable device 200 may identify at least one real world object (e.g., the first real world object 410) corresponding to the gesture of the user among the at least one real world object included in the real world. In an embodiment, the wearable device 200 may determine at least one real world object (e.g., the first real world object 410) corresponding to the gesture of the user as the object of interest. In an embodiment, the wearable device 200 may automatically (e.g., regardless of the user's gaze and/or gesture) determine the object of interest (e.g., the first real world object 410) based on the learned data. For example, when the wearable device 200 is positioned in a specific place at a specific time and/or when a specific sound signal is obtained, the wearable device 200 may automatically (e.g., regardless of the user's gaze and/or gesture) determine the object of interest (e.g., the first real world object 410) based on the learned data.

In an embodiment, in operation 820, the wearable device 200 may provide a sound (e.g., a sound of water flowing from a valley, a bird chirping sound, etc.) related to the object of interest (e.g., a landscape) together with an auditory effect (e.g., background music) and/or a visual effect (e.g., a sun shining image as the third visual effect 910). In an embodiment, when the sound obtained by the wearable device 200 is less than or equal to the designated sensitivity level, the wearable device 200 may output a fourth sound 730 including a sound related to the object of interest (e.g., a landscape) (e.g., a sound of water flowing from a valley or a bird chirping sound) and an auditory effect (e.g., background music). In an embodiment, when the sound obtained by the wearable device 200 exceeds the designated sensitivity level, the wearable device 200 may output a fifth sound including a sound related to the object of interest (e.g., a landscape) (e.g., a sound of water flowing from a valley or a bird chirping sound) and an auditory effect (e.g., background music) together with the obtained sound (e.g., a wind sound). In an embodiment, an external electronic device (e.g., a server) operably connected to the wearable device 200 or the wearable device 200 may store a lookup table in which a relationship between a plurality of objects of interest and auditory effects (e.g., background music) respectively corresponding to the plurality of objects of interest is defined. Alternatively, in an embodiment, learning data related to the object of interest may be stored in the wearable device 200 and/or an external electronic device (e.g., a server) operably connected to the wearable device 200. In an embodiment, the wearable device 200 may provide an auditory effect (e.g., background music) related to the object of interest (e.g., a landscape including a mountain or a rainy landscape) based on the lookup table and/or the learning data. In an embodiment, the data for the auditory effect may be stored in the wearable device 200 or an external electronic device (e.g., a server) operably connected to the wearable device 200. Alternatively, in an embodiment, the wearable device 200 may access the external electronic device (e.g., a server) storing auditory information through a designated application to provide the auditory effect through the wearable device 200 in a streaming manner.

Figure 10:
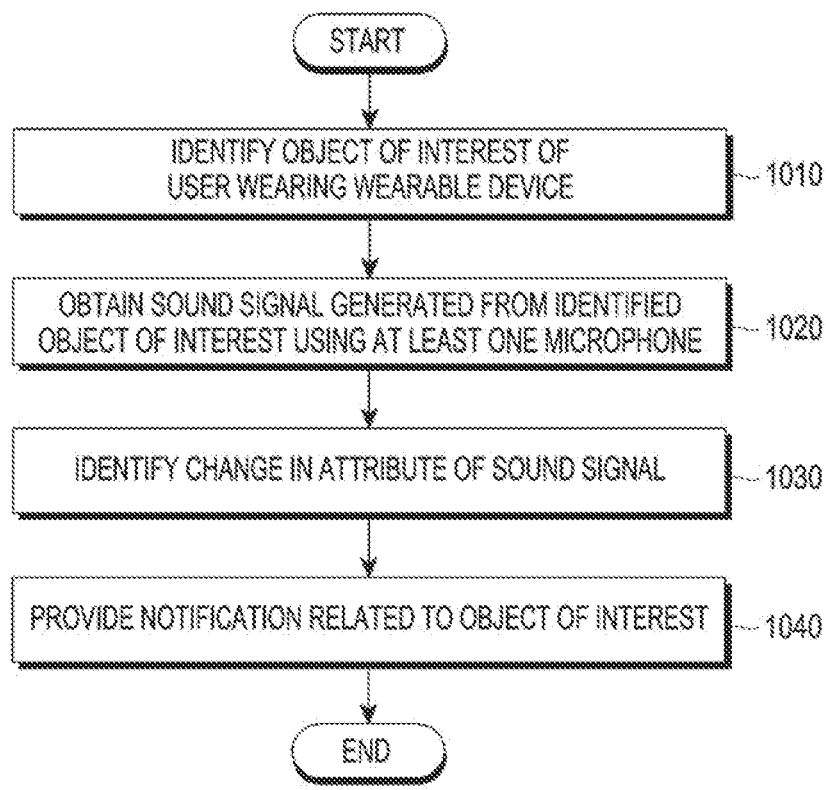
FIG. 10 is a view illustrating an example function or operation of providing a notification related to an object of interest when an attribute of an object-of-interest sound (e.g., a sound generated from the object of interest and obtained by the wearable device) is changed, by a wearable device according to an embodiment.
Figure 11:
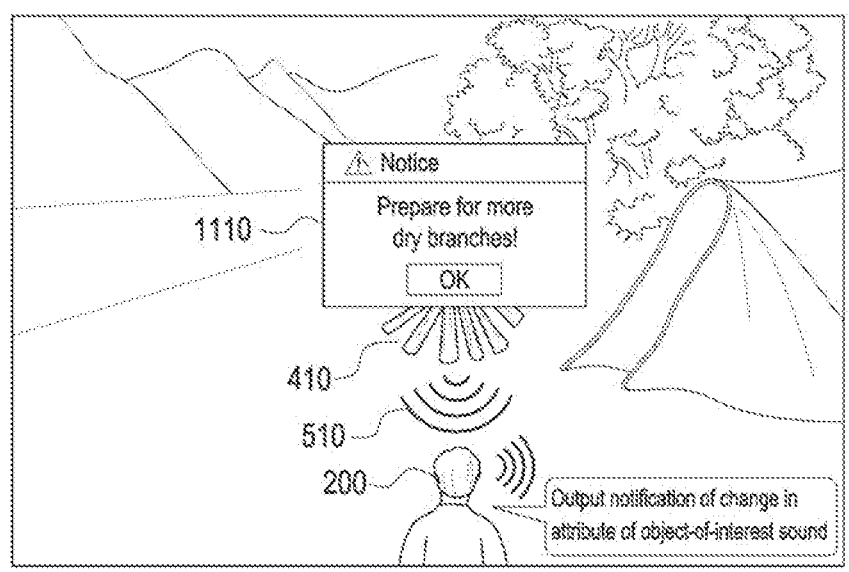
FIG. 11 is a view illustrating an example for describing a function or operation in terms of a user interface in the embodiment described in connection with FIG. 10.

FIG. 10 is a view illustrating an example function or operation of providing a notification (e.g., the first notification 1110) related to an object of interest (e.g., the first real world object 410) when an attribute of an object-of-interest sound (e.g., a sound generated from the object of interest (e.g., the first real world object 410) and obtained by the wearable device 200) is changed, by a wearable device 200 according to an embodiment. FIG. 11 is a view illustrating an example for describing a function or operation in terms of a user interface in the embodiment described in connection with FIG. 10.

Referring to FIG. 10, in an embodiment, in operation 1010, the wearable device 200 may identify an object of interest of the user wearing the wearable device 200. In an embodiment, the object of interest (e.g., the first real world object 410) may include at least one real world object (e.g., the first real world object 410) included in the real world. Alternatively, in an embodiment, the object of interest 410 may include a specific scene (e.g., a landscape including the second real world object 420, the third real world object 430, and/or the fourth real world object 440, as illustrated in FIG. 4B) obtained by at least one camera (e.g., the second camera module 253). In an embodiment, the wearable device 200 may identify the direction of the gaze of the user wearing the wearable device 200 through at least one camera (e.g., the first camera module 251). In an embodiment, the wearable device 200 may identify at least one real world object (e.g., the first real world object 410) corresponding to the gaze of the user among the at least one real world object included in the real world. In an embodiment, the wearable device 200 may determine at least one real world object (e.g., the first real world object 410) corresponding to the gaze of the user as the object of interest. In an embodiment, the wearable device 200 may identify the gesture of the user wearing the wearable device 200 through at least one camera (e.g., the third camera module 255). In an embodiment, the user's gesture may include the user's gesture indicating one specific real world object (e.g., the first real world object 410) among at least one real world object. In an embodiment, the wearable device 200 may identify at least one real world object (e.g., the first real world object 410) corresponding to the gesture of the user among the at least one real world object included in the real world. In an embodiment, the wearable device 200 may determine at least one real world object (e.g., the first real world object 410) corresponding to the gesture of the user as the object of interest. In an embodiment, the wearable device 200 may automatically (e.g., regardless of the user's gaze and/or gesture) determine the object of interest (e.g., the first real world object 410) based on the learned data. For example, when the wearable device 200 is positioned in a specific place at a specific time and/or when a specific sound signal is obtained, the wearable device 200 may automatically (e.g., regardless of the user's gaze and/or gesture) determine the object of interest (e.g., the first real world object 410) based on the learned data.

In an embodiment of the disclosure, in operation 1020, the wearable device 200 may obtain a sound signal generated from the object of interest (e.g., the first real world object 410) identified in operation 1010, using at least one microphone (e.g., the microphone module 247). In an embodiment, the wearable device 200 may perform audio beamforming on at least one object of interest (e.g., the first real world object 410) using at least one microphone (e.g., the microphone module 247). In an embodiment, when there are a plurality of objects of interest, the wearable device 200 may perform audio beamforming on each of the plurality of objects of interest (e.g., the first real world object 410) by using at least one microphone (e.g., the microphone module 247). In an embodiment, when the object of interest is identified as any one scene (e.g., landscape), the wearable device 200 may obtain a sound signal (e.g., wind sound) generated from an external environment by using at least one microphone (e.g., the microphone module 247) without performing audio beamforming on a specific real world object (e.g., non-directionally). Alternatively, in an embodiment, when the object of interest is identified as any one scene (e.g., a landscape), the wearable device 200 may be configured not to obtain a sound signal (e.g., a wind sound) generated from an external environment by deactivating (e.g., switching from an ON state to an OFF state) at least one microphone (e.g., the microphone module 247).

In an embodiment, in operation 1030, the wearable device 200 may identify that an attribute (e.g., sound signal sensitivity) of the obtained sound signal is changed according to operation 1020. In an embodiment, upon identifying that the sensitivity of the obtained sound signal is changed (e.g., when the sensitivity level of the sound signal gradually decreases to a designated level or less) or that a specific sound element included in the obtained sound signal is not obtained (e.g., when a firewood crackling sound is not obtained) while obtaining the sound signal, the wearable device 200 may identify that the attribute of the obtained sound signal has been changed.

In an embodiment, in operation 1040, the wearable device 200 may provide a notification (e.g., the first notification 1110) related to the object of interest (e.g., the first real world object 410). In an embodiment, when the object of interest (e.g., the first real world object 410) is a bonfire, the wearable device 200 may display a notification related to the bonfire (e.g., "Prepare more dry branches") as a virtual object, as illustrated in FIG. 11. In an embodiment, the wearable device 200 may output an auditory message for notifying the user that the attribute of the object-of-interest sound (e.g., a sound generated from the object of interest (e.g., the first real world object 410) and obtained by the wearable device 200) has been changed while displaying a notification (e.g., the first notification 1110) related to the real world object (e.g., the first real world object 410) as a virtual object.

Figure 12:
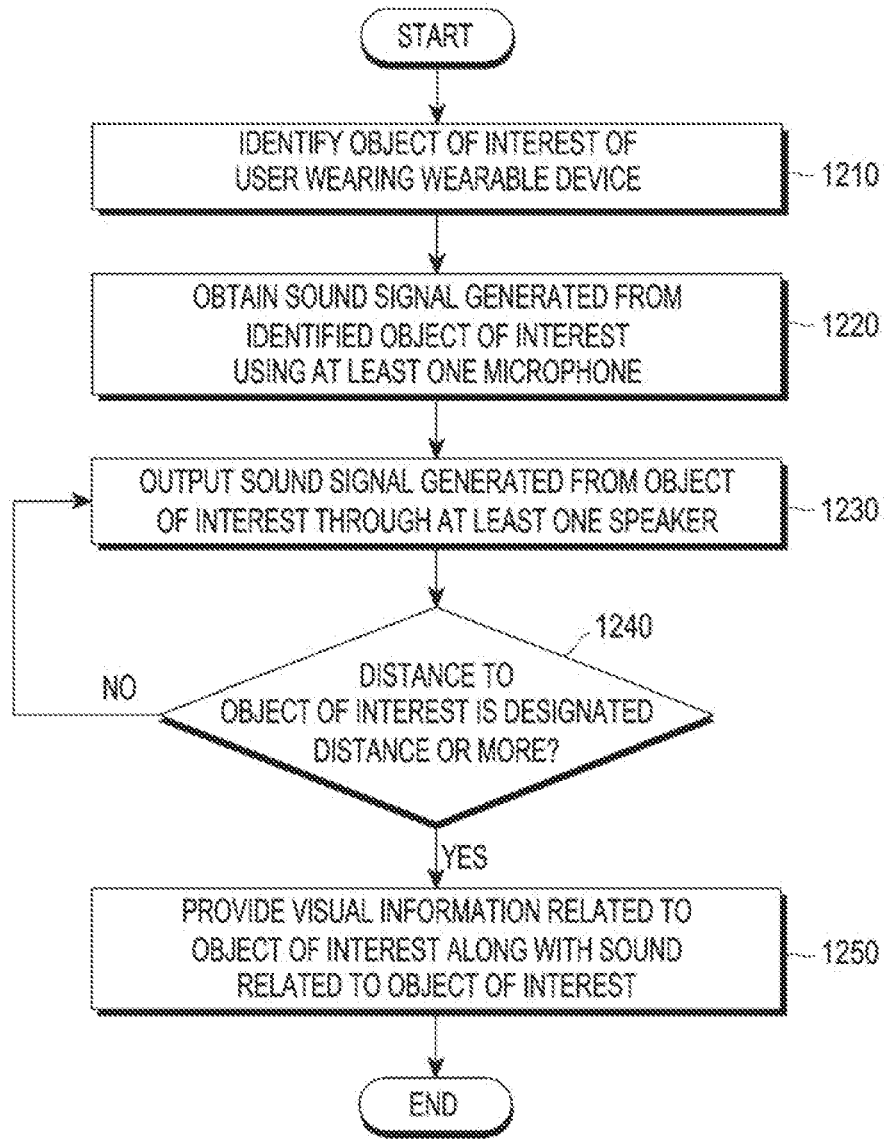
FIG. 12 is a view illustrating an example function or operation of providing visual information related to an object of interest, along with a sound related to the object of interest, when the distance from the object of interest is farther away from a designated distance while outputting an object-of-interest sound (e.g., a sound generated from the object of interest and obtained by the wearable device) by a wearable device according to an embodiment.
Figure 13A:
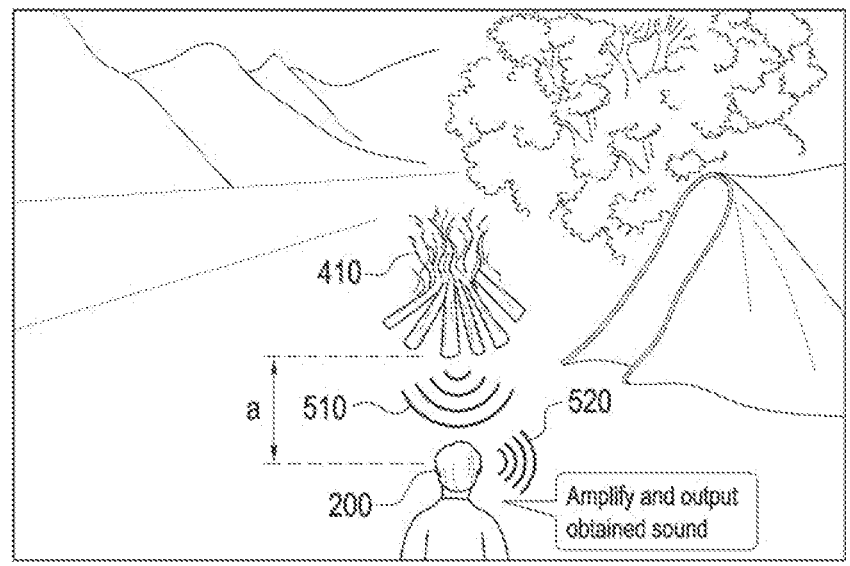
FIGS. 13A, 13B, and 13C are views illustrating examples for describing a function or operation in terms of a user interface in the embodiment described in connection with FIG. 12.
Figure 13B:
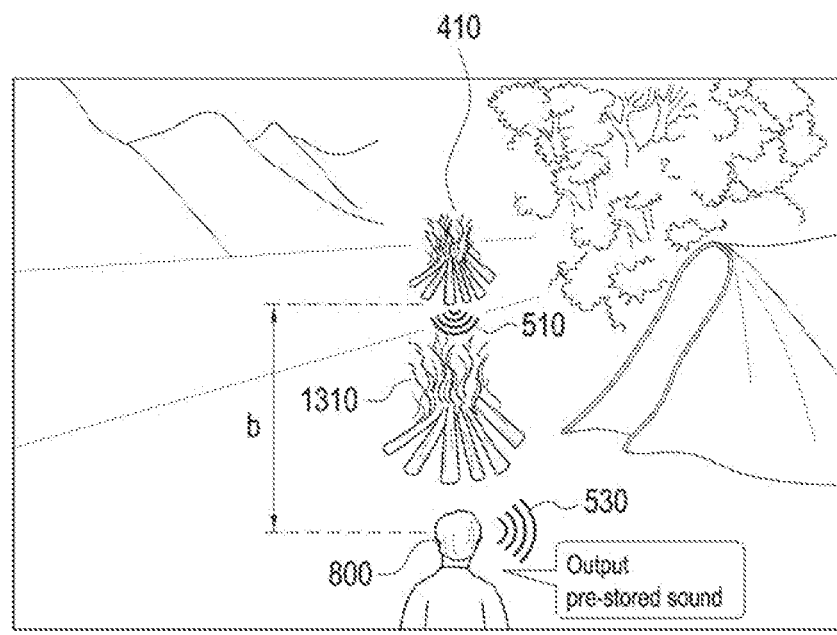
Figure 13C:
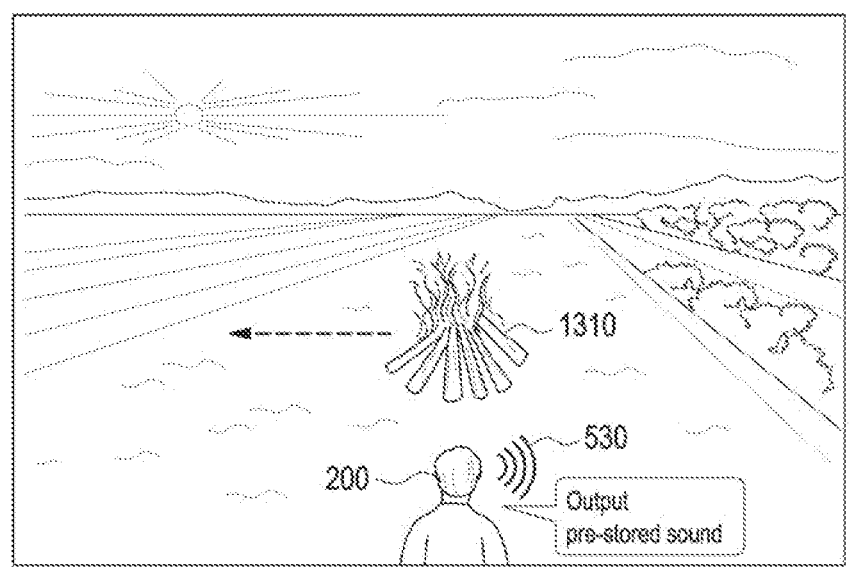

FIG. 12 is a view illustrating an example function or operation of providing visual information (e.g., the first virtual object 1310) related to an object of interest (e.g., the first real world object 410), along with a sound related to the object of interest (e.g., the first real world object 410), when the distance from the object of interest (e.g., the first real world object 410) is farther away from a designated distance while outputting an object-of-interest sound (e.g., a sound generated from the object of interest (e.g., the first real world object 410) and obtained by the wearable device 200) by a wearable device 200 according to an embodiment. FIGS. 13A, 13B, and 13C are views illustrating examples for describing a function or operation in terms of a user interface in the embodiment described in connection with FIG. 12.

Referring to FIG. 12, in an embodiment, in operation 1210, the wearable device 200 may identify an object of interest of the user wearing the wearable device 200. In an embodiment, the object of interest (e.g., the first real world object 410) may include at least one real world object (e.g., the first real world object 410) included in the real world. Alternatively, in an embodiment, the object of interest 410 may include a specific scene (e.g., a landscape including the second real world object 420, the third real world object 430, and/or the fourth real world object 440, as illustrated in FIG. 4B) obtained by at least one camera (e.g., the second camera module 253). In an embodiment, the wearable device 200 may identify the direction of the gaze of the user wearing the wearable device 200 through at least one camera (e.g., the first camera module 251). In an embodiment, the wearable device 200 may identify at least one real world object (e.g., the first real world object 410) corresponding to the gaze of the user among the at least one real world object included in the real world. In an embodiment, the wearable device 200 may determine at least one real world object (e.g., the first real world object 410) corresponding to the gaze of the user as the object of interest. In an embodiment, the wearable device 200 may identify the gesture of the user wearing the wearable device 200 through at least one camera (e.g., the third camera module 255). In an embodiment, the user's gesture may include the user's gesture indicating one specific real world object (e.g., the first real world object 410) among at least one real world object. In an embodiment, the wearable device 200 may identify at least one real world object (e.g., the first real world object 410) corresponding to the gesture of the user among the at least one real world object included in the real world. In an embodiment, the wearable device 200 may determine at least one real world object (e.g., the first real world object 410) corresponding to the gesture of the user as the object of interest. In an embodiment, the wearable device 200 may automatically (e.g., regardless of the user's gaze and/or gesture) determine the object of interest (e.g., the first real world object 410) based on the learned data. For example, when the wearable device 200 is positioned in a specific place at a specific time and/or when a specific sound signal is obtained, the wearable device 200 may automatically (e.g., regardless of the user's gaze and/or gesture) determine the object of interest (e.g., the first real world object 410) based on the learned data.

In an embodiment of the disclosure, in operation 1220, the wearable device 200 may obtain a sound signal generated from the object of interest (e.g., the first real world object 410) identified in operation 1210, using at least one microphone (e.g., the microphone module 247). In an embodiment, the wearable device 200 may perform audio beamforming on at least one object of interest (e.g., the first real world object 410) using at least one microphone (e.g., the microphone module 247). In an embodiment, when there are a plurality of objects of interest, the wearable device 200 may perform audio beamforming on each of the plurality of objects of interest (e.g., the first real world object 410) by using at least one microphone (e.g., the microphone module 247). In an embodiment, when the object of interest is identified as any one scene (e.g., landscape), the wearable device 200 may obtain a sound signal (e.g., wind sound) generated from an external environment by using at least one microphone (e.g., the microphone module 247) without performing audio beamforming on a specific real world object (e.g., non-directionally). Alternatively, in an embodiment, when the object of interest is identified as any one scene (e.g., a landscape), the wearable device 200 may be configured not to obtain a sound signal (e.g., a wind sound) generated from an external environment by deactivating (e.g., switching from an ON state to an OFF state) at least one microphone (e.g., the microphone module 247).

In an embodiment, in operation 1230, the wearable device 200 may output a sound signal generated from the object of interest (e.g., the first real world object 410) through at least one speaker (e.g., the at least one speaker module 245). In an embodiment, as illustrated in FIG. 13A, when the sensitivity of the sound signal generated from the object of interest (e.g., the first real world object 410) and obtained by the wearable device 200 exceeds the designated sensitivity level, the wearable device 200 may output the sound signal generated from the object of interest (e.g., the first real world object 410) and obtained by the wearable device 200, as it is (e.g., without a substantial change in the attribute of the sound signal), or may emphasize and output the sound signal (e.g., output a sound obtained by emphasizing the sound generated from the object of interest (e.g., the first real world object 410). For example, the wearable device 200 may increase and output the volume of the sound signal obtained by the wearable device 200, thereby emphasizing and outputting the obtained sound signal. FIG. 13A illustrates an example in which the distance between the first real world object 410 and the wearable device 200 is relatively short (e.g., the distance "a"). According to an embodiment of the disclosure, when the distance between the first real world object 410 and the wearable device 200 is relatively short (e.g., the distance "a"), the sensitivity level of the sound signal generated from the object of interest (e.g., the first real world object 410) and obtained by the wearable device 200 may exceed the designated sensitivity level. In an embodiment, the wearable device 200 may identify the distance between the first real world object 410 and the wearable device 200 using at least one camera (e.g., the third camera module 255). For example, in an embodiment, the wearable device 200 may identify the distance between the first real world object 410 and the wearable device 200 by generating a virtual plane for the first real world object 410 and identifying the generated virtual plane and the distance between the generated virtual plane and the wearable device 200. Further, various algorithms for identifying the distance between the first real world object 410 and the wearable device 200 may be applied to one or more embodiments of the disclosure.

In an embodiment, in operation 1240, the wearable device 200 may determine whether the distance between the object of interest (e.g., the first real world object 410) and the wearable device 200 is greater than or equal to a designated distance. In an embodiment, as illustrated in FIG. 13B, the wearable device 200 may determine whether the object of interest (e.g., the first real world object 410) is positioned more than a designated distance (e.g., the distance "b") away from the wearable device 200. In an embodiment, instead of performing operation 1240, as illustrated in FIG. 13C, the wearable device 200 may determine whether the object of interest (e.g., the first real world object 410) is not viewed within the field of view (e.g., within the viewing angle of at least one camera (e.g., the second camera module 253) provided in the wearable device 200) of the user wearing the wearable device 200 according to the movement of the wearable device 200 or the object of interest (e.g., the first real world object 410).

In an embodiment, in operation 1250, when the distance to the object of interest (e.g., the first real world object 410) is greater than or equal to the designated distance, the wearable device 200 may provide visual information (e.g., the first virtual object 1310) related to the object of interest (e.g., the first real world object 410) together with a sound related to the object of interest (e.g., the first real world object 410). In an embodiment, the wearable device 200 may provide, as visual information, a virtual object having a shape substantially the same as or similar to that of the object of interest (e.g., the first real world object 410), as visual information (e.g., the first virtual object 1310) related to the object of interest (e.g., the first real world object 410). In an embodiment, the visual information (e.g., the first virtual object 1310) may be stored in the wearable device 200 or may be stored in an external electronic device (e.g., a server) operably connected to the wearable device 200. In an embodiment, while displaying visual information (e.g., the first virtual object 1310), the wearable device 200 may output a sound (e.g., a sound of firewood crackling in a bonfire) related to the object of interest (e.g., the first real world object 410). In an embodiment, while the setting of the object of interest (e.g., the first real world object 410) is maintained (e.g., while the user's gaze is directed toward the real world object (e.g., the first real world object 410)), the wearable device 200 may output visual information (e.g., the first virtual object 1310) and an object-of-interest sound (e.g., a sound (e.g., a sound of firewood crackling in a bonfire) related to the object of interest (e.g., the first real world object 410)). Alternatively, in an embodiment, even while the setting of the object of interest (e.g., the first real world object 410) is maintained, the wearable device 200 may stop outputting the object-of-interest sound (e.g., a sound (e.g., a sound of firewood crackling in a bonfire) related to the object of interest (e.g., the first real world object 410)) when a designated time elapses after outputting the sound of the object of interest (e.g., the sound of the tree branch burning by the bonfire) or when a user input is obtained. In an embodiment, when the object of interest (e.g., the first real world object 410) is not viewed within the field of view of the user wearing the wearable device 200 (e.g., within the viewing angle of at least one camera (e.g., the second camera module 253) provided in the wearable device 200), the wearable device 200 may provide, as visual information, a virtual object (e.g., the first virtual object 1310) having a shape substantially the same as or similar to that of the object of interest (e.g., the first real world object 410). In an embodiment, as illustrated in FIG. 13C, the wearable device 200 may provide information (e.g., an arrow) about the direction in which the object of interest (e.g., the first real world object 410) is positioned. In an embodiment, the wearable device 200 may identify the rotating direction and/or the moving direction of the wearable device 200 by using at least one sensor, and may provide information (e.g., an arrow) about the direction in which the object of interest (e.g., the first real world object 410) is positioned, based on a result of comparing the identified rotating direction and/or moving direction with the direction in which the object of interest (e.g., the first real world object 410) is positioned. In an embodiment of the disclosure, when the object of interest (e.g., the first real world object 410) is moved away from the user's field of view, the wearable device 200 may identify the moving direction of the object of interest (e.g., the first real world object 410) based on the moving image of the object of interest (e.g., the first real world object 410) captured by the at least one camera, thereby providing information (e.g., an arrow) about the direction in which the object of interest (e.g., the first real world object 410) is positioned. FIG. 12 illustrates an embodiment of providing visual information (e.g., the first virtual object 1310) based on a change in the distance between the wearable device 200 and the object of interest (e.g., the first real world object 410) in an embodiment. However, in an embodiment, the wearable device 200 may perform the functions or operations illustrated in FIG. 12 based on changes in the sensitivity level of the sound signal generated from the object of interest (e.g., the first real world object 410) and obtained, without identifying the distance between the wearable device 200 and the object of interest (e.g., the first real world object 410). In an embodiment, the wearable device 200 may provide a visual object (e.g., a surrounding environment information list) for selecting environment information (e.g., snowy day, rainy day, beach, and valley) around the wearable device 200. In an embodiment, the wearable device 200 may provide a designated visual effect (e.g., lightning) according to the user's selection input on the surrounding environment information list. In an embodiment, the visual effect may be pre-stored in the wearable device 200 or may be stored in an external electronic device. In an embodiment, when the visual/audible effect is stored in the external electronic device, information about the visual and/or auditory effect may be transmitted to the wearable device 200 and additionally stored in the wearable device 200.

Figure 14:
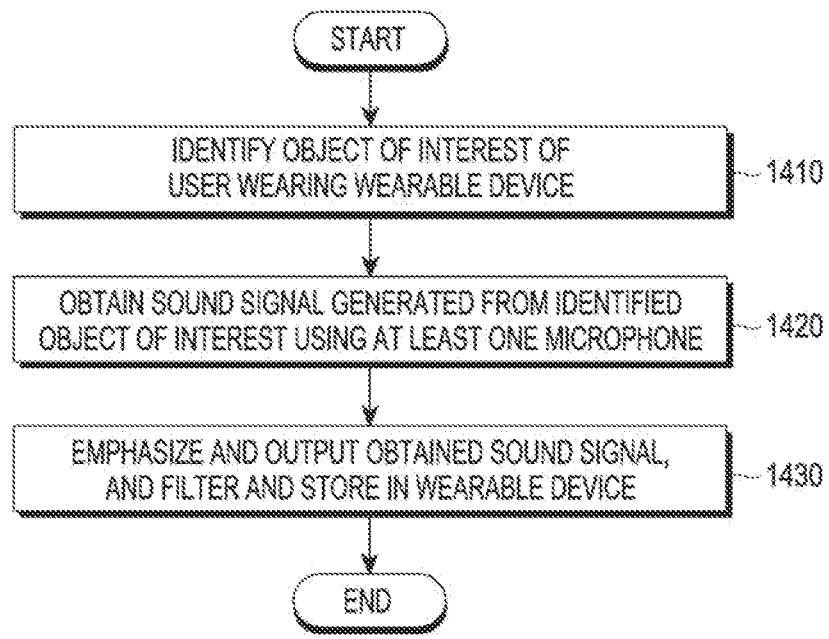
FIG. 14 is a view illustrating an example function or operation of emphasizing and outputting a sound signal obtained from an object of interest and filtering and storing the same in a wearable device, by the wearable device according to an embodiment.
Figure 15:
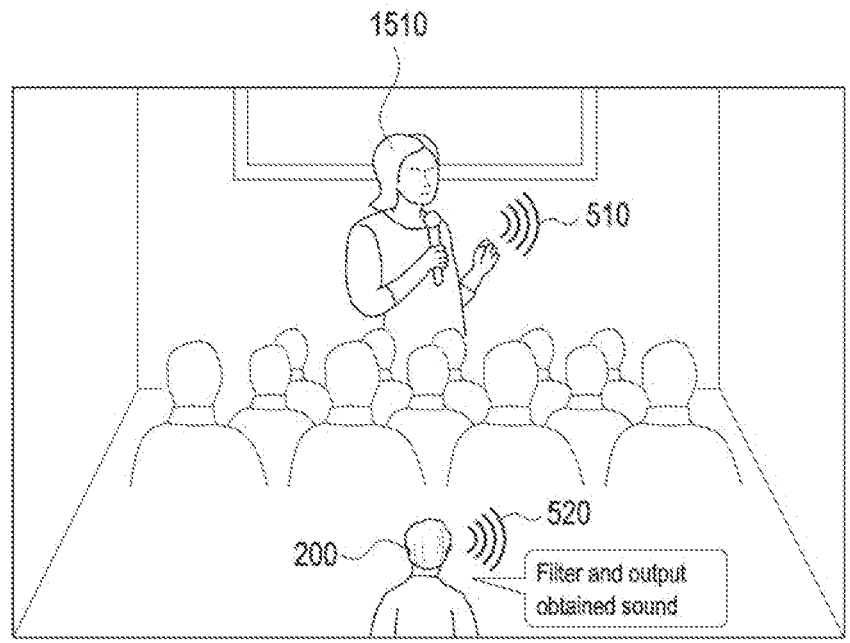
FIG. 15 is a view illustrating an example for describing a function or operation in terms of a user interface in the embodiment described in connection with FIG. 14.

FIG. 14 is a view illustrating an example function or operation of emphasizing and outputting a sound signal obtained from an object of interest (e.g., the second real world object 1510, as a speaker) and filtering and storing the same in a wearable device, by the wearable device 200 according to an embodiment. FIG. 15 is a view illustrating an example for describing a function or operation in terms of a user interface in the embodiment described in connection with FIG. 14.

Referring to FIG. 14, in an embodiment, in operation 1410, the wearable device 200 may identify an object of interest of the user wearing the wearable device 200. In an embodiment, the object of interest (e.g., the second real world object 1510) may include at least one real world object (e.g., the second real world object 1510) included in the real world. In an embodiment, the wearable device 200 may identify the direction of the gaze of the user wearing the wearable device 200 through at least one camera (e.g., the first camera module 251). In an embodiment, the wearable device 200 may identify at least one real world object (e.g., the second real world object 1510) corresponding to the gaze of the user among the at least one real world object included in the real world. In an embodiment, the wearable device 200 may determine at least one real world object (e.g., the second real world object 1510) corresponding to the gaze of the user as the object of interest. In an embodiment, the wearable device 200 may identify the gesture of the user wearing the wearable device 200 through at least one camera (e.g., the third camera module 255). In an embodiment, the user's gesture may include the user's gesture indicating one specific real world object (e.g., the second real world object 1510) among at least one real world object. In an embodiment, the wearable device 200 may identify at least one real world object (e.g., the second real world object 1510) corresponding to the gesture of the user among the at least one real world object included in the real world. In an embodiment, the wearable device 200 may determine at least one real world object (e.g., the second real world object 1510) corresponding to the gesture of the user as the object of interest. In an embodiment, the wearable device 200 may automatically (e.g., regardless of the user's gaze and/or gesture) determine the object of interest (e.g., the second real world object 1510) based on the learned data. For example, when the wearable device 200 is positioned in a specific place at a specific time and/or when a specific sound signal is obtained, the wearable device 200 may automatically (e.g., regardless of the user's gaze and/or gesture) determine the object of interest (e.g., the second real world object 1510) based on the learned data.

In an embodiment of the disclosure, in operation 1420, the wearable device 200 may obtain a sound signal generated from the object of interest (e.g., the second real world object 1510) identified in operation 1410, using at least one microphone (e.g., the microphone module 247). In an embodiment, the wearable device 200 may perform audio beamforming on at least one object of interest (e.g., the second real world object 1510) using at least one microphone (e.g., the microphone module 247). In an embodiment, when there are a plurality of objects of interest, the wearable device 200 may perform audio beamforming on each of the plurality of objects of interest (e.g., the second real world object 1510) by using at least one microphone (e.g., the microphone module 247).

In an embodiment, in operation 1430, the wearable device 200 may emphasize and output the sound signal obtained according to operation 1420. In an embodiment, the wearable device 200 may filter the output sound signal and store the filtered sound signal in the wearable device 200. For example, the wearable device 200 may increase and output the volume of the sound signal obtained by the wearable device 200, thereby emphasizing and outputting the obtained sound signal. In an embodiment, after filtering (e.g., noise canceling) the obtained sound signal, the wearable device 200 may store the sound signal in the wearable device 200 or an external electronic device (e.g., a server) by using a speech to text algorithm. In an embodiment, the wearable device 200 may display a sound signal converted into text according to a user input or automatically, as a virtual object.

Figure 16:
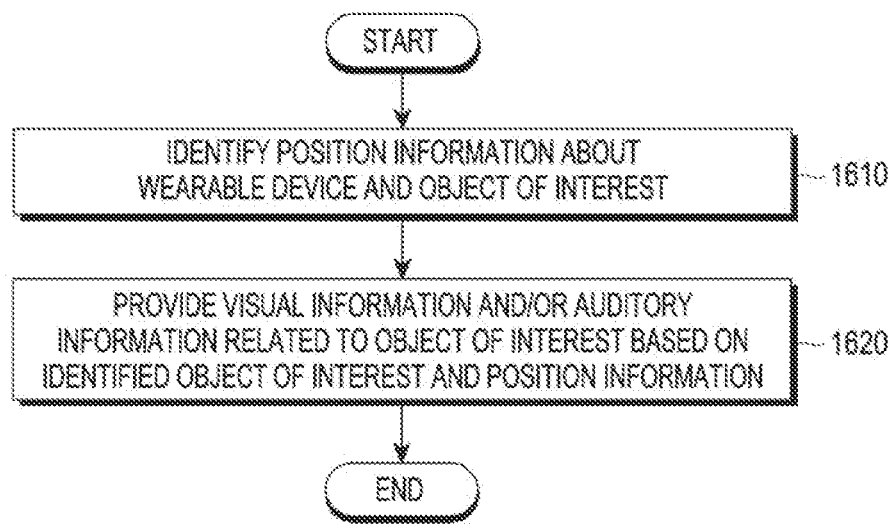
FIG. 16 is a view illustrating an example function or operation of providing visual information and/or auditory information related to an object of interest based on the object of interest and position information identified by a wearable device, by the wearable device according to an embodiment.
Figure 17A:
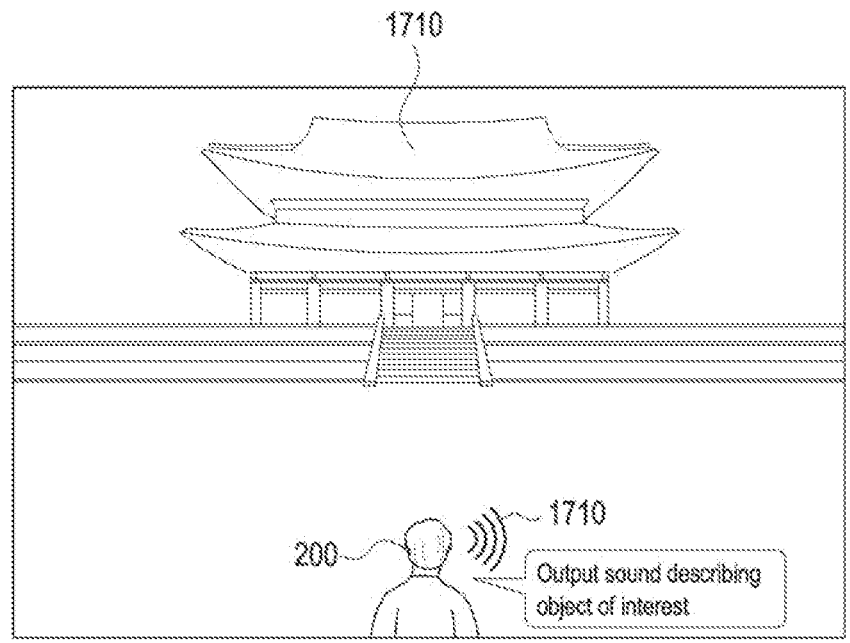
FIGS. 17A and 17B are views illustrating examples for describing a function or operation in terms of a user interface in the embodiment described in connection with FIG. 16.
Figure 17B:
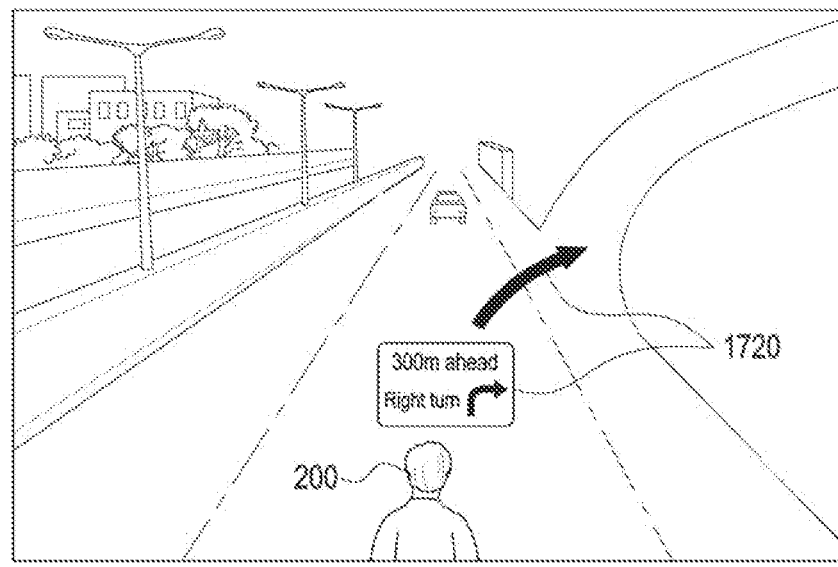

FIG. 16 is a view illustrating an example function or operation of providing visual information (e.g., the second visual information 1720) and/or auditory information (e.g., a sound describing the object of interest (e.g., the third real world object 1710)) related to an object of interest (e.g., the third real world object 1710) based on the object of interest (e.g., the third real world object 1710) and position information identified by a wearable device 200, by the wearable device 200 according to an embodiment. FIGS. 17A and 17B are views illustrating examples for describing a function or operation in terms of a user interface in the embodiment described in connection with FIG. 16.

Referring to FIG. 16, in an embodiment, in operation 1610, the wearable device 200 may identify the object of interest and position information about the user wearing the wearable device 200. In an embodiment, the object of interest (e.g., the third real world object 1710) may include at least one real world object (e.g., the third real world object 1710) included in the real world. In an embodiment, the wearable device 200 may identify the direction of the gaze of the user wearing the wearable device 200 through at least one camera (e.g., the first camera module 251). In an embodiment, the wearable device 200 may identify at least one real world object (e.g., the third real world object 1710) corresponding to the gaze of the user among the at least one real world object included in the real world. In an embodiment, the wearable device 200 may determine at least one real world object (e.g., the third real world object 1710) corresponding to the gaze of the user as the object of interest. In an embodiment, the wearable device 200 may identify the gesture of the user wearing the wearable device 200 through at least one camera (e.g., the third camera module 255). In an embodiment, the user's gesture may include the user's gesture indicating one specific real world object (e.g., the third real world object 1710) among at least one real world object. In an embodiment, the wearable device 200 may identify at least one real world object (e.g., the third real world object 1710) corresponding to the gesture of the user among the at least one real world object included in the real world. In an embodiment, the wearable device 200 may determine at least one real world object (e.g., the third real world object 1710) corresponding to the gesture of the user as the object of interest. In an embodiment, the wearable device 200 may automatically (e.g., regardless of the user's gaze and/or gesture) determine the object of interest (e.g., the third real world object 1710) based on the learned data. For example, when the wearable device 200 is positioned in a specific place at a specific time and/or when a specific sound signal is obtained, the wearable device 200 may automatically (e.g., regardless of the user's gaze and/or gesture) determine the object of interest (e.g., the third real world object 1710) based on the learned data. In an embodiment, the wearable device 200 may identify position information about the wearable device 200 using at least one sensor (e.g., a GPS sensor). In an embodiment, the wearable device 200 may use various positioning algorithms (e.g., a positioning algorithm using "image matching", a positioning algorithm using "marker recognition", and/or a positioning algorithm using the strength of a wireless communication signal such as Wi-Fi) to determine the position of the wearable device 200. In an embodiment, the wearable device 200 may specify the object of interest (e.g., the third real world object 1710 and/or the road) and the current position of the wearable device 200 based on the shape of the real world object (e.g., the third real world object 1710 and/or the road) and the position information about the wearable device 200.

In an embodiment, in operation 1620, the wearable device 200 may provide visual information and/or auditory information related to the object of interest (e.g., the third real world object 1710 and/or the road), based on the object of interest and the position information identified according to operation 1610. In an embodiment, the wearable device 200 may provide information (e.g., a description of a historic site) about a specific object of interest (e.g., the third real world object 1710 as the historic site), as visual information and/or auditory information. In an embodiment, the wearable device 200 may determine the current state (e.g., driving) of the user wearing the wearable device 200 based on the object of interest (e.g., a road) of the wearable device 200, current position, and/or moving speed detected by at least one sensor (e.g., a camera module, a gyro sensor, an acceleration sensor, and/or a GPS sensor). In an embodiment, the wearable device 200 may provide visual information (e.g., navigation information) and/or auditory information related to the object of interest (e.g., a road), based on the determined current state of the user. In an embodiment, the wearable device 200 may execute a designated application to provide visual information (e.g., navigation information) and/or auditory information related to the object of interest (e.g., a road), and may provide visual information (e.g., navigation information) and/or auditory information related to the object of interest (e.g., a road) through the executed application.

Figure 18:
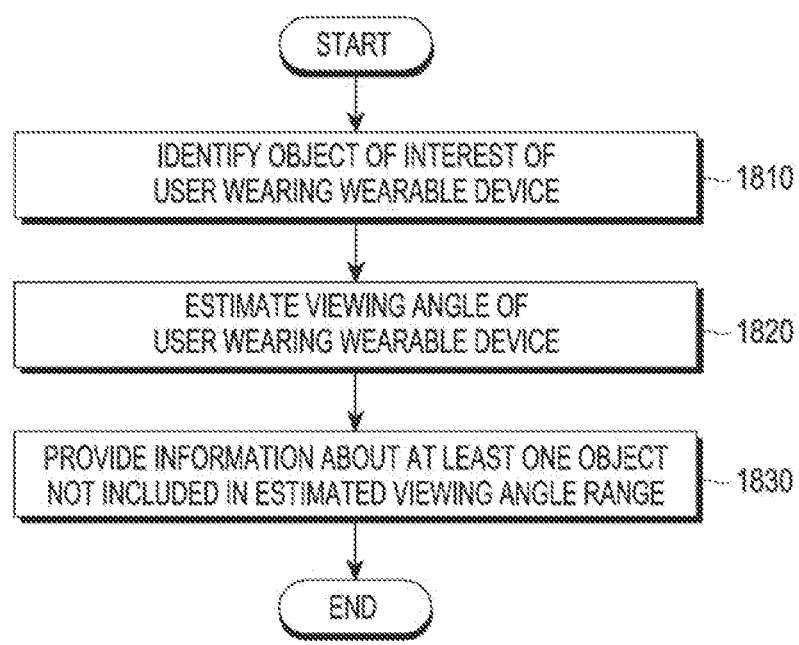
FIG. 18 is a view illustrating an example function or operation of providing information about at least one object not included in a viewing angle range of a user wearing a wearable device, by the wearable device according to an embodiment.
Figure 19A:
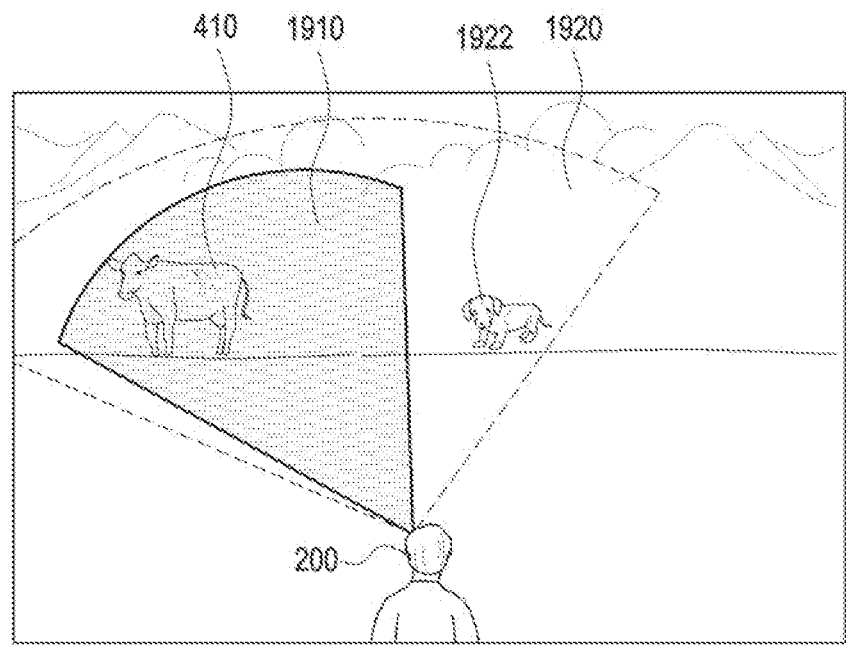
FIGS. 19A and 19B are views illustrating examples for describing a function or operation in terms of a user interface in the embodiment described in connection with FIG. 18.
Figure 19B:
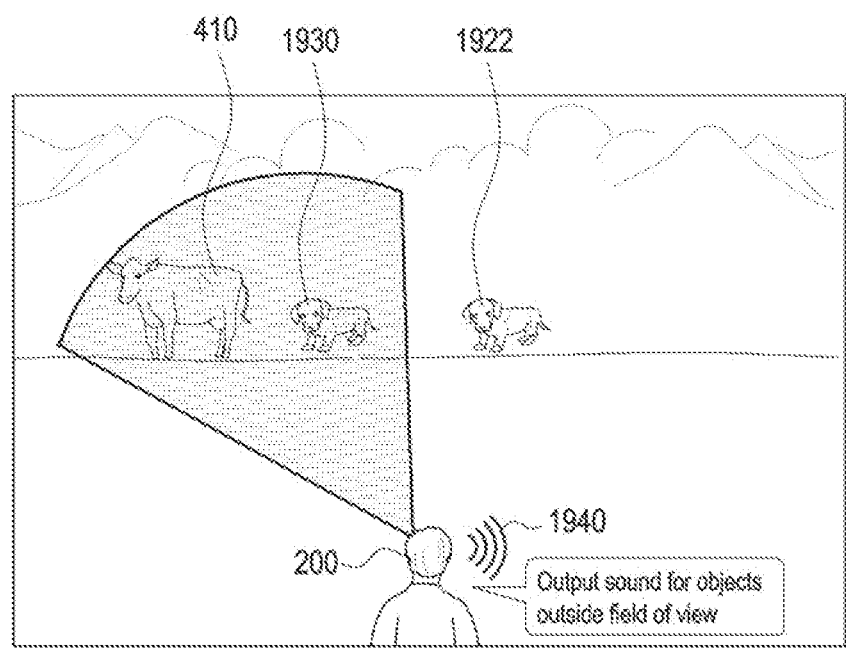

FIG. 18 is a view illustrating an example function or operation of providing information about at least one object 1922 not included in a viewing angle range 1910 of a user wearing a wearable device 200, by the wearable device 200 according to an embodiment. FIGS. 19A and 19B are views illustrating examples for describing a function or operation in terms of a user interface in the embodiment described in connection with FIG. 18.

Referring to FIG. 18, in an embodiment, in operation 1810, the wearable device 200 may identify an object of interest of the user wearing the wearable device 200. In an embodiment, the object of interest (e.g., the fourth real world object 440) may include at least one real world object (e.g., the fourth real world object 440) included in the real world. In an embodiment, the wearable device 200 may identify the direction of the gaze of the user wearing the wearable device 200 through at least one camera (e.g., the first camera module 251). In an embodiment, the wearable device 200 may identify at least one real world object (e.g., the fourth real world object 440) corresponding to the gaze of the user among the at least one real world object included in the real world. In an embodiment, the wearable device 200 may determine at least one real world object (e.g., the fourth real world object 440) corresponding to the gaze of the user as the object of interest. In an embodiment, the wearable device 200 may identify the gesture of the user wearing the wearable device 200 through at least one camera (e.g., the third camera module 255). In an embodiment, the user's gesture may include the user's gesture indicating one specific real world object (e.g., the fourth real world object 440) among at least one real world object. In an embodiment, the wearable device 200 may identify at least one real world object (e.g., the fourth real world object 440) corresponding to the gesture of the user among the at least one real world object included in the real world. In an embodiment, the wearable device 200 may determine at least one real world object (e.g., the fourth real world object 440) corresponding to the gesture of the user as the object of interest. In an embodiment, the wearable device 200 may automatically (e.g., regardless of the user's gaze and/or gesture) determine the object of interest (e.g., the fourth real world object 440) based on the learned data. For example, when the wearable device 200 is positioned in a specific place at a specific time and/or when a specific sound signal is obtained, the wearable device 200 may automatically (e.g., regardless of the user's gaze and/or gesture) determine the object of interest (e.g., the fourth real world object 440) based on the learned data.

In an embodiment, in operation 1820, the wearable device 200 may estimate a viewing angle of the user wearing the wearable device 200. In an embodiment, the wearable device 200 may estimate a viewing angle for a direction parallel to the horizon and a direction perpendicular to the horizon. In an embodiment of the disclosure, the wearable device 200 may estimate an area included within a designated angle range with respect to the gaze of the user toward the object of interest as the viewing angle range 1910 of the user. In an embodiment, the wearable device 200 may compare the estimated viewing angle range 1910 of the user with the viewing angle of at least one camera (e.g., the second camera module 253) provided in the wearable device 200. In an embodiment, the wearable device 200 may determine whether there is a real world object (e.g., at least one real world object 1922) that is not included in the viewing angle range 1910 of the user, based on a result of comparing viewing angles.

In an embodiment, in operation 1830, the wearable device 200 may provide information about at least one object (e.g., at least one real world object 1922) that is not included in the viewing angle range estimated according to operation 1820. In an embodiment, as illustrated in FIG. 19B, the wearable device 200 may output visual information (e.g., a virtual object (e.g., the second virtual object 1930) having a shape substantially identical or similar to at least one real world object 1922) and/or auditory information (e.g., a dog barking sound, as a sound representing at least one real world object 1922) about at least one object (e.g., at least one real world object 1922) that is not included in the estimated viewing angle range of the user. In an embodiment, the wearable device 200 may display the visual information (e.g., a virtual object (e.g., the second virtual object 1930) having a shape substrate identical or similar to the at least one real world object 1922) about the at least one object (e.g., the at least one real world object 1922) that is not included in the estimated viewing angle range 1910 of the user to be included in the estimated viewing angle range 1910 of the user.

Figure 20A:
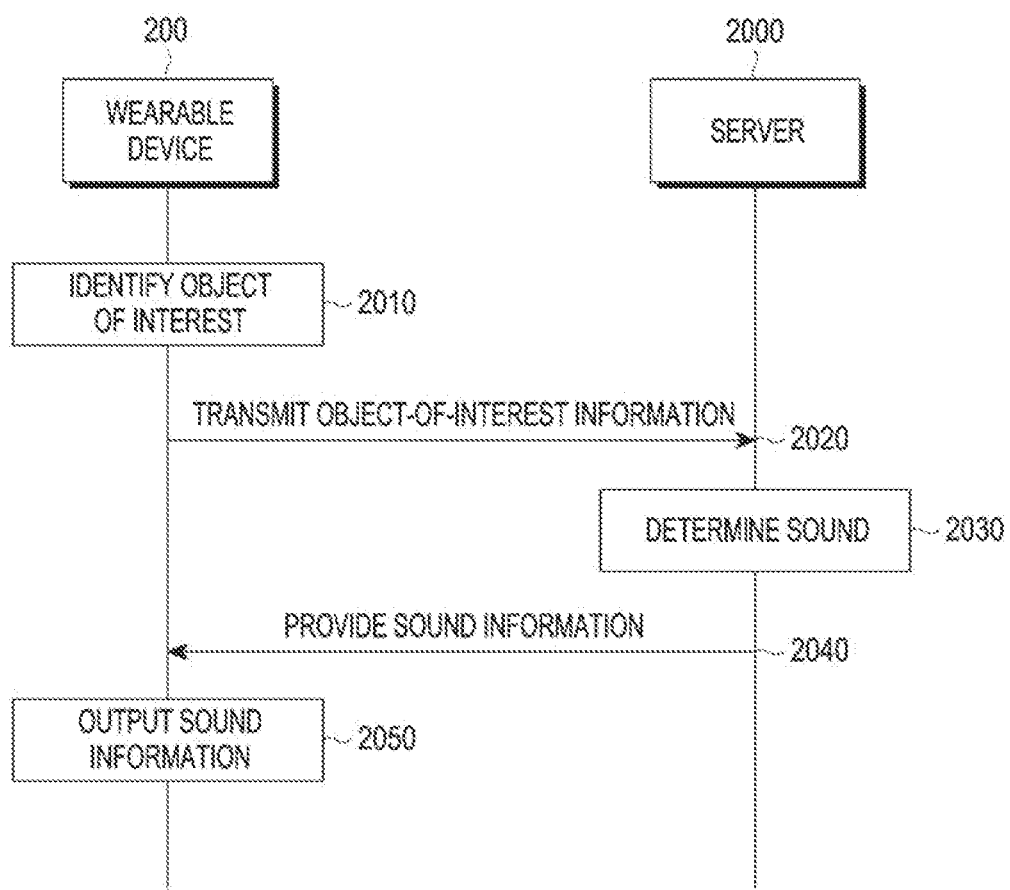
FIG. 20A is a view illustrating an example function or operation of determining an object-of-interest sound by an external electronic device (e.g., a server) operably connected to a wearable device according to an embodiment.

FIG. 20A is a view illustrating an example function or operation of determining an object-of-interest sound by an external electronic device (e.g., a server 2000) operably connected to a wearable device 200 according to an embodiment.

Referring to FIG. 20A, in an embodiment, the wearable device 200 may identify the object of interest in operation 2010. In an embodiment, in operation 2020, the wearable device 200 may transmit information about the object of interest to an external electronic device (e.g., the server 2000). In an embodiment, the external electronic device (e.g., the server 2000) may determine the object-of-interest sound in operation 2030. In an embodiment, the external electronic device (e.g., the server 2000) may transmit information about the object-of-interest sound to the wearable device 200 in operation 2040. In an embodiment, in operation 2050, the wearable device 200 may output information about the object-of-interest sound.

Figure 20B:
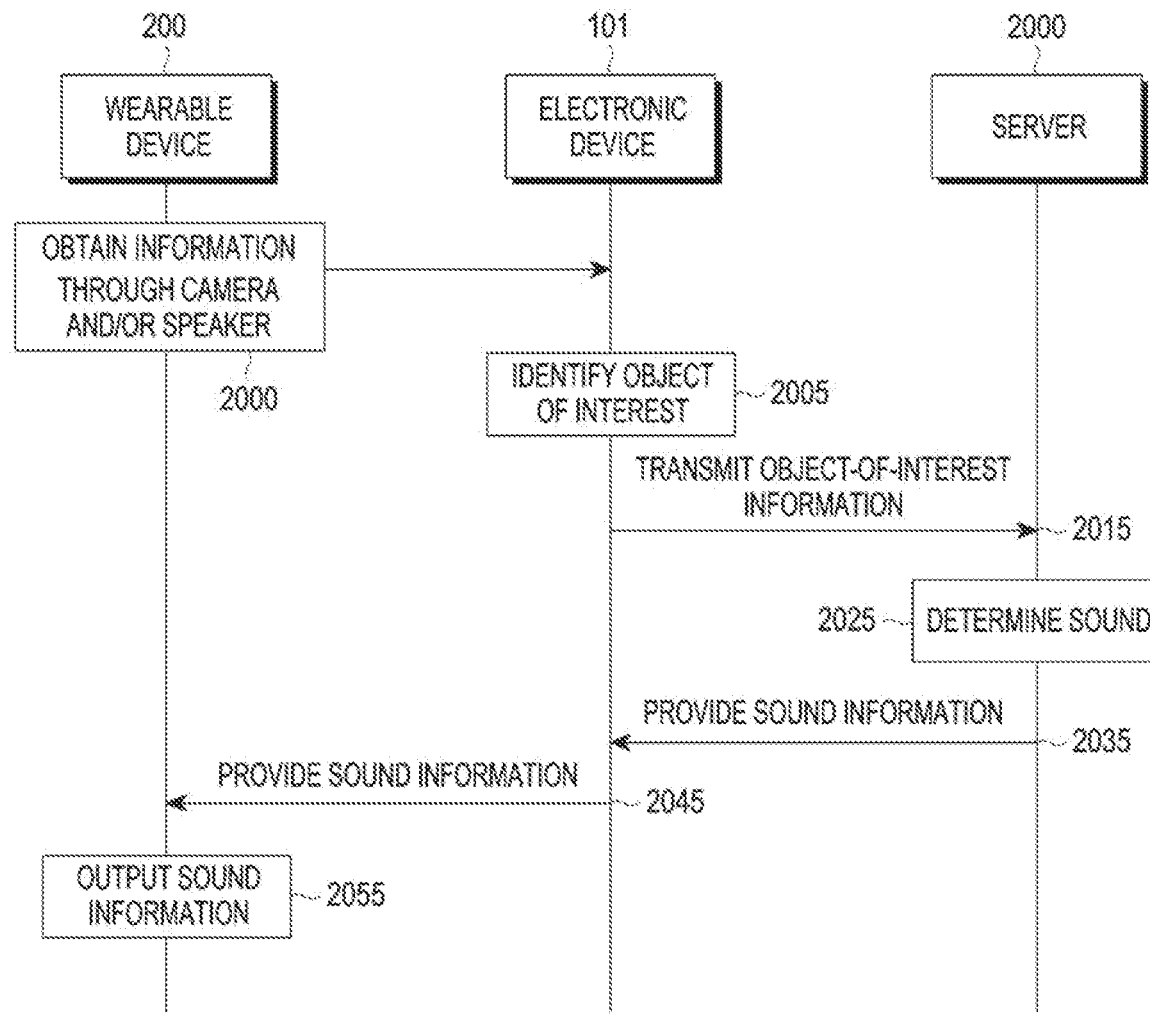
FIG. 20B is a view illustrating an example function or operation of identifying an object of interest by a first external electronic device (e.g., a smartphone) operably connected to a wearable device and determining an object-of-interest sound by a second external electronic device (e.g., a server) operably connected to the wearable device according to an embodiment.

FIG. 20B is a view illustrating an example function or operation of identifying an object of interest by a first external electronic device (e.g., the electronic device 101) operably connected to a wearable device 200 and determining an object-of-interest sound by a second external electronic device (e.g., a server 2000) operably connected to the wearable device 200 according to an embodiment.

Referring to FIG. 20B, in an embodiment, in operation 2000, the wearable device 200 may obtain information through a camera and/or a speaker, and may transmit the obtained information to the electronic device 101. In an embodiment, in operation 2005, the electronic device 101 may identify the object of interest, based on the obtained information. In an embodiment, the electronic device 101 may identify the object of interest based on information (e.g., image information about the surrounding environment, user gaze information, or the like) transmitted from the wearable device 200. In an embodiment, the electronic device 101 may obtain, from the wearable device 200, information related to identifying the object of interest, such as information about at least one image obtained by the wearable device 200, information about the gaze of the user wearing the wearable device 200, or gesture information obtained from the user wearing the wearable device 200. The function or operation of obtaining such information related to identifying the object of interest may be performed before operation 2005. In an embodiment, in operation 2015, the electronic device 101 may transmit information about the object of interest to an external electronic device (e.g., the server 2000). In an embodiment, the external electronic device (e.g., the server 2000) may determine the object-of-interest sound in operation 2025. In an embodiment, the external electronic device (e.g., the server 2000) may transmit information about the object-of-interest sound to the electronic device 101 in operation 2035. In an embodiment, the first external electronic device (e.g., the electronic device 101) may transmit information about the object-of-interest sound to the wearable device 200 in operation 2045. In an embodiment, in operation 2055, the wearable device 200 may output information about the object-of-interest sound.

In an embodiment, the wearable device 200 may store the currently performed function or operation (e.g., the function or operation of providing the sound related to the object of interest) and use the stored function or operation-related information when providing the sound related to the object of interest or determination of the object of interest performed after the current time. In an embodiment, the wearable device 200 may provide information about the sound related to the object of interest, information about the visual effect, and/or information about the auditory effect to the external electronic device (e.g., another wearable device) operably connected to the wearable device 200. In an embodiment, the other wearable device may provide, e.g., the visual effect to another wearable device based on the information provided from the wearable device 200. In an embodiment, if the wearable device 200 provides a virtual reality environment where there is an avatar corresponding to the user of the wearable device 200 directly or indirectly (e.g., via another external electronic device operably connected to the wearable device 200), the wearable device 200 may capture the real world including the object of interest currently shown to the user, control the display module to display the captured real world, along with the sound related to the object of interest, in the virtual reality environment, or transmit information about the captured real world and/or sound information related to the object of interest to the external electronic device. Accordingly, the object of interest and/or the sound related to the object of interest may be provided in the virtual reality environment, like in the real world environment.

Although various embodiments of the disclosure have been described herein with reference to the wearable device 200 configured to provide augmented reality, according to one or more embodiments of the disclosure, one or more embodiments of the disclosure may also be provided through a wearable device 200 configured to provide virtual reality. For example, one or more embodiments of the disclosure may be provided through a video see through (VST) device as well. In this case, in an embodiment, while providing an image for real world obtained by at least one camera of the wearable device 200 or an image for a designated virtual reality, the wearable device 200 may apply one or more embodiments of the disclosure described above to at least one object of interest included in the image for the real world or the image for the virtual reality in the same or a similar manner.

The electronic device according to one or more embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that one or more embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

One or more embodiments as set forth herein may be implemented as software (e.g., the program 2540) including one or more instructions that are stored in a storage medium (e.g., internal memory 2536 or external memory 2538) that is readable by a machine (e.g., the electronic device 2501). For example, a processor (e.g., the processor 2520) of the machine (e.g., the electronic device 2501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to one or more embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities. Some of the plurality of entities may be separately disposed in different components. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A wearable device comprising:
   at least one microphone;
   at least one speaker;
   at least one memory storing instructions; and
   at least one processor;
   wherein the instructions, when executed by the at least one processor, cause the wearable device to:
   identify an object of interest,
   obtain, using the at least one microphone, a sound from the object of interest,
   output through the at least one speaker, based on a sensitivity of the sound from the object of interest, the sound from the object of interest or a sound related to the object of interest, and
   based on identifying the sensitivity of the sound from the object of interest as being less than a designated level, output, through the at least one speaker, a sound stored in the at least one memory corresponding to the object of interest.

2. The wearable device of claim 1, further comprising:
   at least one camera,
   wherein the instructions, when executed by the at least one processor, further cause the wearable device to identify the object of interest based on the sound from the object of interest or an image obtained by the at least one camera.

3. The wearable device of claim 1,
   wherein the instructions, when executed by the at least one processor, further cause the wearable device to control the at least one speaker to output an amplified version of the sound from the object of interest.

4. The wearable device of claim 1, further comprising:
   at least one display module,
   wherein the instructions, when executed by the at least one processor, further cause the wearable device to control the at least one display module to display image information related to the object of interest as a virtual object.

5. The wearable device of claim 1, wherein the instructions, when executed by the at least one processor, further cause the wearable device to output, through the at least one speaker, the sound from the object of interest and an effect sound related to the sound from the object of interest.

6. The wearable device of claim 4, wherein the instructions, when executed by the at least one processor, further cause the wearable device to: based on identifying whether the sensitivity of the sound from the object of interest decreases, provide a notification related to the object of interest through the at least one speaker or the at least one display module.

7. The wearable device of claim 1, wherein the instructions, when executed by the at least one processor, further cause the wearable device to, based on identifying that the object of interest is positioned outside a viewing angle range of a user wearing the wearable device, provide a virtual object representing the object of interest and the sound related to the object of interest.

8. The wearable device of claim 1, further comprising: at least one sensor, wherein the instructions, when executed by the at least one processor, further cause the wearable device to provide information related to the object of interest based on position information about the wearable device detected by the at least one sensor and a shape of the object of interest.

9. The wearable device of claim 1, wherein the instructions, when executed by the at least one processor, further cause the wearable device to: estimate a viewing angle of a user wearing the wearable device, and provide, based on the estimated viewing angle, an image corresponding to at least one real world object positioned outside the estimated viewing angle or a sound related to the at least one real world object.

10. A method for controlling a wearable device, the method comprising:
identifying an object of interest;
obtaining a sound from the object of interest using at least one microphone of the wearable device;
output through the at least one speaker, based on a sensitivity of the sound from the object of interest, the sound from the object of interest or a sound related to the object of interest; and
based on identifying the sensitivity of the sound from the object of interest as being less than the designated level, outputting, through the at least one speaker, a sound corresponding to the object of interest stored in at least one memory of the wearable device.

11. The method of claim 10, further comprising:
identifying the object of interest based on the sound from the object of interest or an image obtained by at least one camera of the wearable device.

12. The method of claim 10, further comprising:
based on identifying the sensitivity of the sound from the object of interest as being equal to or greater than a designated level, outputting, through the at least one speaker, an amplified version of the sound from the object of interest.

13. The method of claim 10, further comprising:
controlling at least one display module of the wearable device to display image information related to the object of interest as a virtual object.

14. The method of claim 10, further comprising:
outputting, through the at least one speaker, the sound from the object of interest and an effect sound related to the sound from the object of interest.

15. The method of claim 13, further comprising:
based on identifying whether the sensitivity of the sound from the object of interest decreases, providing a notification related to the object of interest through the at least one speaker or the at least one display module.

16. The method of claim 10, further comprising:
based on identifying that the object of interest is positioned outside a viewing angle range of a user wearing the wearable device, providing a virtual object representing the object of interest and the sound related to the object of interest.

17. The method of claim 10, further comprising:
providing information related to the object of interest based on position information about the wearable device detected by at least one sensor of the wearable device and a shape of the object of interest.

18. A non-transitory computer readable medium having instructions stored therein, which when executed by at least one processor cause the at least one processor to execute a method of controlling a wearable device, the method comprising:
identifying an object of interest;
obtaining a sound from the object of interest using at least one microphone of the wearable device;
output through the at least one speaker, based on a sensitivity of the sound from the object of interest, the sound from the object of interest or a sound related to the object of interest; and
based on identifying the sensitivity of the sound from the object of interest as being less than the designated level, outputting, through the at least one speaker, a sound corresponding to the object of interest stored in at least one memory of the wearable device.

* * * * *